United States Patent
Higashi

(10) Patent No.: US 9,434,367 B2
(45) Date of Patent: Sep. 6, 2016

(54) BRAKE CONTROL APPARATUS

(71) Applicant: Hitachi Automotive Systems, Ltd., Hitachinaka-shi, Ibaraki (JP)

(72) Inventor: Toshihiko Higashi, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 16 days.

(21) Appl. No.: 14/305,764

(22) Filed: Jun. 16, 2014

(65) Prior Publication Data
US 2014/0375113 A1    Dec. 25, 2014

(30) Foreign Application Priority Data

Jun. 21, 2013    (JP) .................................. 2013-130082

(51) Int. Cl.
| | |
|---|---|
| *B60T 13/68* | (2006.01) |
| *B60T 13/16* | (2006.01) |
| *B60T 13/18* | (2006.01) |
| *B60T 13/58* | (2006.01) |
| *B60T 8/40* | (2006.01) |
| *B60T 13/14* | (2006.01) |

(52) U.S. Cl.
CPC .............. *B60T 13/16* (2013.01); *B60T 8/4081* (2013.01); *B60T 13/18* (2013.01); *B60T 13/58* (2013.01); *B60T 13/686* (2013.01); *B60T 13/146* (2013.01)

(58) Field of Classification Search
CPC .... B60T 13/146; B60T 13/686; B60T 7/042; B60T 8/4081
See application file for complete search history.

(56) References Cited

U.S. PATENT DOCUMENTS

| | | | | |
|---|---|---|---|---|
| 5,882,089 | A * | 3/1999 | Nakamura | B60T 8/341 303/10 |
| 6,322,164 | B1 * | 11/2001 | Sakamoto | B60T 8/3275 303/114.3 |
| 7,533,944 | B2 * | 5/2009 | Mizutani | B60T 8/365 303/113.4 |
| 2008/0001473 | A1 | 1/2008 | Mizutani et al. | |
| 2008/0234909 | A1 * | 9/2008 | Iwasaki | B60T 1/10 701/70 |
| 2014/0152085 | A1 * | 6/2014 | Biller | B60T 8/4081 303/10 |
| 2015/0007559 | A1 * | 1/2015 | Oosawa | B60T 7/042 60/585 |
| 2015/0061358 | A1 * | 3/2015 | Maruo | B60T 8/17 303/3 |
| 2015/0175144 | A1 * | 6/2015 | Watanabe | B60T 8/4081 303/10 |
| 2015/0314765 | A1 * | 11/2015 | Maruo | B60T 8/4081 303/10 |

FOREIGN PATENT DOCUMENTS

JP    2008-6893 A    1/2008

* cited by examiner

*Primary Examiner* — Thomas Irvin
(74) *Attorney, Agent, or Firm* — Crowell & Moring LLP

(57) ABSTRACT

A brake control apparatus includes a first pressure-applying section connected through a first oil passage to a wheel cylinder; a pump; a communication valve provided on a second oil passage which connects the first oil passage with the pump; a backflow passage connecting a suction side of the pump with a portion between the pump and the communication valve; a pressure-regulating valve provided on the backflow passage; and a control unit. The control unit attains a first state that causes the first pressure-applying section to apply hydraulic pressure to the wheel cylinder, and a second state that causes the pump to apply hydraulic pressure to the wheel cylinder by driving the pump and at least one of the communication valve and the pressure-regulating valve. The control unit actuates the at least one with a delay relative to an actuation of the pump, when switching to the second state.

18 Claims, 16 Drawing Sheets

BRAKE CONTROL APPARATUS

BACKGROUND OF THE INVENTION

The present invention relates to a brake control apparatus mounted on a vehicle.

Some brake apparatuses include a so-called servo unit which generates an assist force for assisting a brake manipulating force of a driver by means of energy source different from the brake manipulating force of the driver. US Patent Application Publication No. 2008/0001473 (corresponding to Japanese Patent Application Publication No. 2008-006893) discloses a previously-proposed brake apparatus that includes a hydraulic booster as the servo unit. In this brake apparatus, a depressing force of brake pedal is boosted by pressure energy accumulated in an accumulator by a pump. Then, the boosted depressing force is transmitted to a master cylinder.

SUMMARY OF THE INVENTION

However, in the technique of the above patent application, there is a risk that energy efficiency is reduced because the servo operation is constantly performed in response to the brake manipulation of the driver.

It is an object of the present invention to provide a brake control apparatus devised to improve the energy efficiency.

According to one aspect of the present invention, there is provided a brake control apparatus comprising: a first pressure-applying section connected through a first oil passage to a wheel cylinder, and configured to apply hydraulic pressure to the wheel cylinder; a pump provided separately from the first pressure-applying section, and configured to apply hydraulic pressure to the wheel cylinder; a communication valve provided on a second oil passage which connects the first oil passage with the pump; a backflow passage connecting a suction side of the pump with a portion between the pump and the communication valve in the second oil passage, the backflow passage being connected with a pressure-reducing oil passage; a pressure-regulating valve provided on the backflow passage; and a control unit configured to control the pump, the communication valve and the pressure-regulating valve, wherein the control unit is configured to attain a first state that causes the first pressure-applying section to apply hydraulic pressure to the wheel cylinder, and a second state that causes the pump to apply hydraulic pressure to the wheel cylinder by driving the pump and at least one of the communication valve and the pressure-regulating valve in an opening direction, and to actuate the at least one of the communication valve and the pressure-regulating valve with a delay relative to an actuation of the pump, when switching from the first state to the second state.

According to another aspect of the present invention, there is provided a brake control apparatus comprising: a first pressure-applying section connected through a first oil passage to a wheel cylinder, and configured to apply hydraulic pressure to the wheel cylinder; a pump provided separately from the first pressure-applying section, and configured to apply hydraulic pressure to the wheel cylinder; a communication valve provided on a second oil passage which connects the first oil passage with the pump; a backflow passage connecting a suction side of the pump with a portion between the pump and the communication valve in the second oil passage, the backflow passage being connected with a pressure-reducing oil passage; and a pressure-regulating valve provided on the backflow passage, wherein a first state in which the first pressure-applying section applies hydraulic pressure to the wheel cylinder is set against a second state in which the pump applies hydraulic pressure to the wheel cylinder by actuations of the pump and at least one of the communication valve and the pressure-regulating valve, and the first state is shifted into the second state by actuating the pump in advance of actuating the at least one of the communication valve and the pressure-regulating valve in an opening direction.

According to still another aspect of the present invention, there is provided a brake control apparatus comprising: a primary-line oil passage including a plurality of wheel cylinders to which hydraulic pressure of a first chamber of a master cylinder is able to be applied by a pedal manipulation of a driver; a secondary-line oil passage including a plurality of wheel cylinders to which hydraulic pressure of a second chamber of the master cylinder is able to be applied by the pedal manipulation; a shutoff valve provided on each of the primary-line oil passage and the secondary-line oil passage; a communication passage connecting the primary-line oil passage with the secondary-line oil passage; a pump configured to discharge brake fluid into the communication passage; a first communication valve provided on the communication passage and configured to restrict a brake-fluid flow from the communication passage toward the primary-line oil passage; a second communication valve provided on the communication passage and configured to restrict a brake-fluid flow from the communication passage toward the secondary-line oil passage; a backflow passage connecting a suction side of the pump with a portion between the pump and one of the first and second communication valves in the communication passage, the backflow passage being connected with a pressure-reducing oil passage having a low pressure; and a pressure-regulating valve provided on the backflow passage, wherein a first state in which the master cylinder applies hydraulic pressure to the wheel cylinders by actuating the shutoff valve in an opening direction is set against a second state in which the pump applies hydraulic pressure to the wheel cylinders by selectively driving the shutoff valve, the first and second communication valves, the pressure-regulating valve and the pump, wherein a way to shift the first state into the second state has a first mode and a second mode, in the first mode, the pressure-regulating valve is opened after actuating the shutoff valve in a closing direction and actuating the pump, and in the second mode, the shutoff valve is actuated in the closing direction, after actuating the pressure-regulating valve in the opening direction, actuating at least one of the first and second communication valves in the closing direction, and actuating the pump.

The other objects and features of this invention will become understood from the following description with reference to the accompanying drawings.

DETAILED DESCRIPTION OF THE INVENTION

Figure 1:
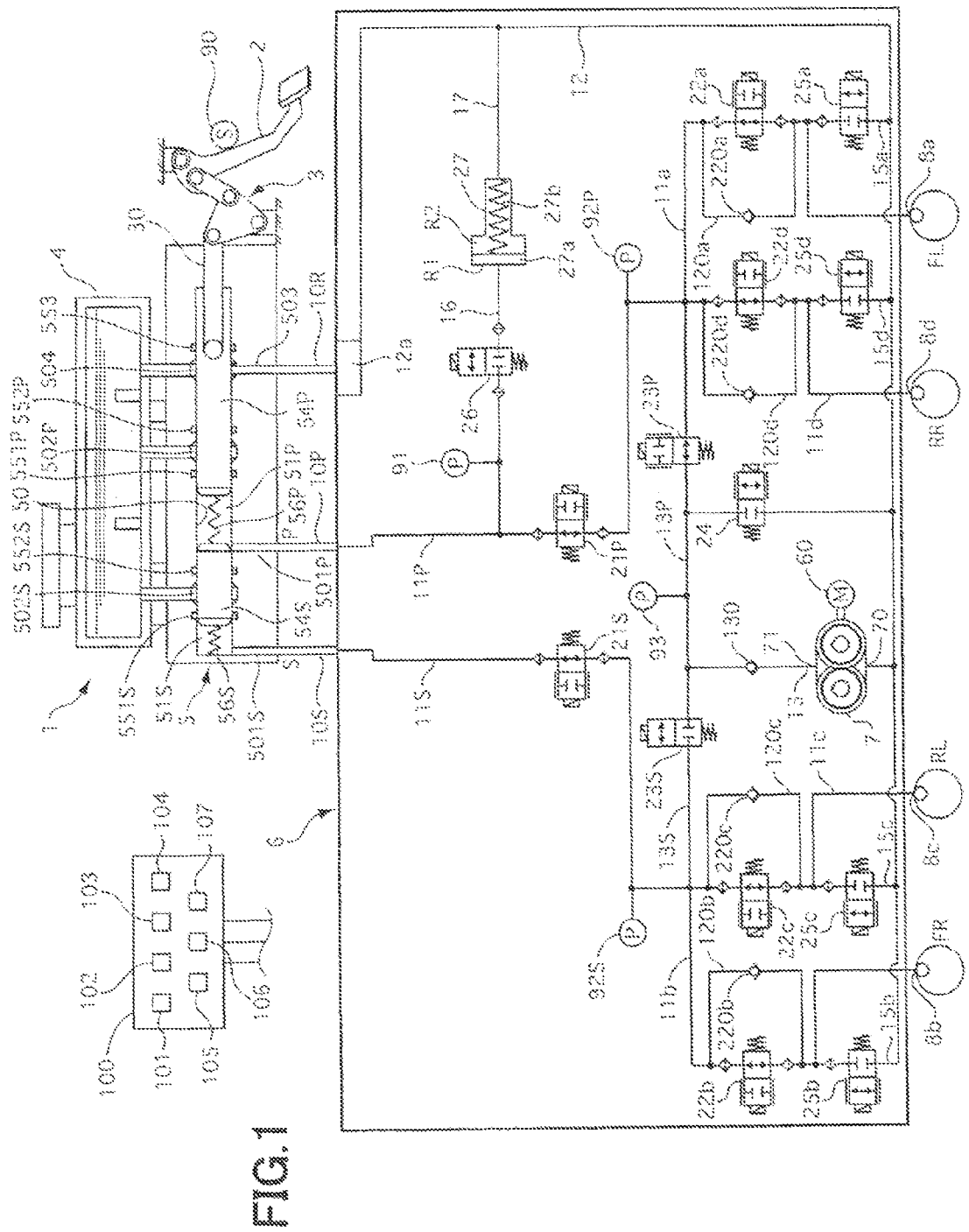
FIG. 1 is a schematic view of a brake apparatus in a first embodiment according to the present invention.

Reference will hereinafter be made to the drawings in order to facilitate a better understanding of the present invention. Respective embodiments of brake control apparatus according to the present invention will be explained below in detail, referring to the drawings.

First Embodiment

FIG. 1 is a schematic view of a brake apparatus (hereinafter, also referred to as the apparatus 1) in a first embodiment according to the present invention. The apparatus 1 in the first embodiment is applied to a brake system for an electrically-driven vehicle. The electrically-driven vehicle is, for example, a hybrid vehicle equipped with an electric motor (/generator) in addition to an engine as a power plant (drive source) for driving road-wheels, or a battery vehicle equipped with only an electric motor (/generator) as the power plant. Such an electrically-driven vehicle can perform a regenerative braking in which a regenerative braking device including a motor (/generator) brakes the vehicle by regenerating electric energy from kinetic energy of the vehicle. However, the apparatus 1 in the first embodiment may be applied to a non-electrically-driven vehicle which is equipped with only an engine as the power plant. The apparatus 1 is a hydraulic brake apparatus which generates a braking force by giving a brake-fluid pressure to each road wheel of the vehicle. Specifically, when a brake fluid (oil) is supplied to a wheel cylinder 8 provided to each road-wheel of the vehicle, a piston installed in the wheel cylinder 8 is pressed so that a brake pad provided as a friction member is pressed to a brake disk which is rotating together with the road-wheel. Thereby, each road-wheel receives hydraulic braking force. It is noted that a disk brake including the brake disk may be replaced with a drum brake. The apparatus 1 can perform a regenerative cooperation control in which a desired braking force, e.g. a braking force requested by a driver is produced by means of a proper distribution between the hydraulic braking force and the regenerative braking force of the regenerative braking device.

The apparatus 1 includes a brake pedal 2, a link mechanism 3, a reservoir tank 4 (hereinafter, also referred to as the reservoir), a master cylinder 5, a hydraulic unit 6, a pedal-stroke sensor 90, and an electronic control unit 100 (hereinafter, also referred to as the ECU). The brake pedal 2 is a brake-manipulation member which receives an input of brake manipulation of the driver. The link mechanism 3 can vary a transformation rate between a depressing force (brake-manipulating force) and a depression amount (pedal stroke) of the brake pedal 2 by the driver. The reservoir tank 4 functions as a brake-fluid source which stores brake fluid. The master cylinder 5 is connected through the link mechanism 3 with the brake pedal 2. Brake fluid is supplied from the reservoir 4 to the master cylinder 5 such that the master cylinder 5 generates brake-fluid pressure according to the manipulation of the brake pedal 2 (brake manipulation) by the driver. It is noted that the master cylinder 5 corresponds to a first brake-fluid-pressure generating source according to the present invention. The stroke sensor 90 detects a displacement of the brake pedal 2 as the brake manipulation amount. It is noted that the stroke sensor 90 corresponds to a brake-manipulation-amount detecting section or means according to the present invention. The hydraulic unit 6 receives brake fluid from the reservoir 4 or the master cylinder 5, and thereby generates a brake-fluid pressure independently from the brake manipulation of the driver. It is noted that the hydraulic unit 6 corresponds to a second brake-fluid-pressure generating source according to the present invention. The ECU 100 controls operations of the hydraulic unit 6. The reservoir 4, the master cylinder 5, the hydraulic unit 6 (electromagnetic valves and pump 7) and the ECU 100 are integrally provided to constitute the apparatus 1 as one unit. A motor 60 for driving the pump 7 is integrally attached to the hydraulic unit 6.

The apparatus 1 does not include a negative-pressure-type booster (hereinafter, also referred to as the engine negative-pressure booster) which boosts or amplifies a brake-manipulating force (pedal depressing force) by use of a manifold air-pressure depression generated by the engine. The link mechanism 3 is a depressing-force amplifying mechanism provided between the brake pedal 2 and the master cylinder 5. A linking member of the link mechanism 3 which is located at an input side of the link mechanism 3 is rotatably connected with the brake pedal 2. A linking member of the link mechanism 3 which is located at an output side of the link mechanism 3 is rotatably connected with a pushrod 30. The master cylinder 5 is of tandem-type. The master cylinder 5 includes a primary piston 54P and a secondary piston 54S of free-piston type. The primary piston 54P is connected with the pushrod 30, and functions as a master-cylinder piston which moves in an axial direction of the primary piston 54P in accordance with the brake manipulation of the driver.

The hydraulic unit 6 is provided between the wheel cylinders 8 (8a-8d) and the master cylinder 5. The hydraulic unit 6 can supply a master-cylinder pressure or a control hydraulic pressure individually to each wheel cylinder 8. The hydraulic unit 6 includes the pump 7 and a plurality of control valves (such as the electromagnetic valves 21-26) as hydraulic devices (actuators) for generating the control hydraulic pressure. The pump 7 is rotationally driven by the motor 60, and thereby, the pump 7 sucks brake fluid within the reservoir 4 and discharges the brake fluid toward the wheel cylinders 8. In the first embodiment, a gear pump which is superior in noise-and-vibration reduction performance and the like is used as the pump 7. Specifically, the pump 7 is an externally-contacted gear pump. P-line (a pine line P) and S-line (a pipe line S) use the pump 7 (i.e., one pump) in common with each other. The pump 7 is driven by one motor 60 for both of the P-line and S-line. The motor 60 is, for example, a brushed motor. Each of the electromagnetic valves 21-26 controls a flow of brake fluid by opening and closing according to a control signal for each valve 21-26. When the communication between the master cylinder 5 and the respective wheel cylinders 8 is in a blocked state, the hydraulic unit 6 can increase the pressure of each wheel cylinder 8 by hydraulic pressure generated by the pump 7. The hydraulic unit 6 includes a stroke simulator 27 which produces or simulates the pedal stroke by receiving an inflow of brake fluid according to the driver's brake manipulation from the master cylinder 5 (when the communication between the master cylinder 5 and the respective wheel cylinders 8 is in the blocked state). Moreover, the hydraulic unit 6 includes hydraulic sensors 91 to 93 which detect a discharge pressure of the pump 7 and the master-cylinder pressure.

The ECU 100 receives detection values derived from the pedal-stroke sensor 90 and the hydraulic sensors 91 to 93, and an information related to a running state of the vehicle derived from the other sensors or control unit(s). The ECU 100 controls the respective actuators of the hydraulic unit 6 on the basis of installed programs. Specifically, the ECU 100 controls opening and closing actions of the electromagnetic valves 21-26 such that state of each oil passage is switched between the communicated state and the blocked state. Moreover, the ECU 100 controls a rotational speed of the motor 60, i.e. controls a discharge amount (discharge rate) of the pump 7. Accordingly, the ECU 100 realizes a servo control for reducing or assisting the brake-manipulating force, an anti-lock brake control (Anti-lock Brake System: ABS) for suppressing a slip of the road-wheel caused due to braking, a brake control for a vehicle motion control (Vehicle Dynamics Control: VDC or Vehicle-behavior Stability Control such as an anti-skid control), an automatic brake control such as a leading-vehicle follow-up control, and a regenerative cooperation brake control for controlling the hydraulic pressure of each wheel cylinder 8 in cooperation with the regenerative braking so as to attain a target deceleration (target braking force). In the servo control, the hydraulic pressure of the wheel cylinder 8 is made higher than the master-cylinder pressure by driving the hydraulic unit 6 (and thereby by use of the discharge pressure of the pump 7) when the driver manipulates the brake pedal. By so doing, a hydraulic braking force larger than the brake manipulating force of the driver can be produced. Hence, a servo function for assisting the brake manipulation is attained. That is, the ECU 100 can assist or amplify the brake manipulating force, by operating the hydraulic unit 6 (pump 7) instead of the engine negative-pressure booster which is not provided in the first embodiment. In the regenerative cooperation brake control, for example, hydraulic braking force is generated which compensates for the lack of regenerative braking force of the regenerative braking device in order to produce a braking force desired by the driver.

The master cylinder 5 is connected through an aftermentioned first oil passage 11 with the wheel cylinders 8. The master cylinder 5 is a first hydraulic source capable of increasing hydraulic pressure of the wheel cylinder 8. Specifically, the master-cylinder pressure generated in a first fluid chamber 51P of the master cylinder 5 can increase hydraulic pressures of the wheel cylinders 8a and 8d through an oil passage (the first oil passage 11P) of the P-line. On the other hand, the master-cylinder pressure generated in a second fluid chamber 51S of the master cylinder 5 can increase hydraulic pressures of the wheel cylinders 8b and 8c through an oil passage (the first oil passage 11S) of the S-line. The pistons 54P and 54S are provided inside the master cylinder 5 formed in a cylindrical-tube shape having its bottom. The pistons 54P and 54S are movable along an inner circumferential surface of the master cylinder 5 in the axial direction of the master cylinder 5. The master cylinder 5 includes discharge ports (supply ports) 501P and 501S and resupply ports 502P and 502S for the P-line and the S-line. The discharge ports 501P and 501S are connected with the hydraulic unit 6, and can be communicated with (i.e., open to) the wheel cylinders 8a to 8d. The resupply ports 502P and 502S are connected with the reservoir 4, and communicate with the reservoir 4. Moreover, the master cylinder 5 includes a suction port 503 and a resupply port 504. The suction port 503 is connected with the hydraulic unit 6, and communicates with a suction portion 70 of the pump 7. The resupply port 504 is connected with the reservoir 4, and communicates with the reservoir 4. A coil spring 56P which functions as a return spring is disposed in the first fluid chamber 51P given between the pistons 54P and 54S, under a compressed state. In the same manner, a coil spring 56S is disposed in the second fluid chamber 51S given between the piston 54S and an axial end portion of the cylinder 50, under a compressed state. The discharge ports 501P and 501S are always open respectively to the first and second fluid chambers 51P and 51S. The resupply port 504 is always in communication with (open to) the suction port 503.

A plurality of piston seals 551 to 553 are attached to an inner circumference of the cylinder 50. Each of the piston seals 551 to 553 is slidably in contact with one of the pistons 54P and 54S such that a gap between the inner circumferential surface of the cylinder 50 and an outer circumferential surface of the piston 54P or 54S is sealed. Each piston seal 551-553 is a known sealing member (cup seal) which is formed in a cup shape in cross section and which includes a lip portion at a radially inner side thereof. Under a state where this lip portion is slidably in contact with the outer circumferential surface of the piston 54, brake fluid is allowed to flow in one direction and is inhibited from flowing in another direction. The first piston seal 551P allows brake fluid to flow from the resupply port 502P toward the first fluid chamber 51P (i.e., toward the discharge port 501P), and inhibits brake fluid from flowing in the reverse direction. In the same manner, the first piston seal 551S allows brake fluid to flow from the resupply port 502S toward the second fluid chamber 51S (i.e., toward the discharge port 501S), and inhibits brake fluid from flowing in the reverse direction. The third piston seal 553 inhibits external brake fluid from flowing from the resupply port 504 to the cylinder 50. A volume of each of the first and second fluid chambers 51P and 51S is reduced when the pistons 54P and 54S move in stroke motion in an axial direction away from the brake pedal 2 in response to the depressing manipulation of the brake pedal 2 by the driver, so that hydraulic pressure (the master-cylinder pressure) is produced. Thereby, brake fluid is supplied from the first and second fluid chambers 51P and 51S through the discharge ports 501P and 501S toward the wheel cylinders 8*a* to 8*d*. At this time, the first fluid chamber 51P of the P-line has a hydraulic pressure level substantially equal to that of the second fluid chamber 51S of the S-line.

Next, a brake fluid-pressure circuit of the hydraulic unit 6 will now be explained referring to FIG. 1. In FIG. 1, a member having suffix "a", "b", "c" or "d" corresponds to the road-wheel FL, FR, RL or RR in this order. The hydraulic unit 6 includes the first oil passage 11 (11P, 11S, 11*a*-11*d*), a normally-open shutoff valve 21 (21P, 21S), a normally-open pressure-increasing valve 22 (22*a* to 22*d*), a suction oil passage 12, a discharge oil passage 13 (13P, 13S), a check valve 130, a normally-open communication valve 23P, a normally-closed communication valve 23S, a first pressure-reducing oil passage 14, a normally-closed pressure-regulating valve 24, a second pressure-reducing oil passage 15 (15*a* to 15*d*), a normally-closed pressure-reducing valve 25 (25*a* to 25*d*), a first simulator oil passage 16, a normally-closed stroke simulator valve 26, and a second simulator oil passage 17. The first oil passage 11 connects the discharge ports 501P and 501S (the first and second fluid chambers 51P and 51S) of the master cylinder 5 with the wheel cylinders 8*a* to 8*d*. The shutoff valve 21 is of normally-open type (i.e., the shutoff valve 21 is open when not energized) and is provided in the first oil passage 11 (11P, 11S). The pressure-increasing valve 22 (hereinafter, also referred to as the SOL/VIN 22) is provided between the shutoff valve 21 and the wheel cylinder 8 in the first oil passage 11. Specifically, the pressure-increasing valves 22*a* to 22*d* are respectively provided in the oil passages 11*a* to 11*d* corresponding to the road-wheels FL to RR. The suction oil passage 12 connects the suction port 503 of the master cylinder 5 with the suction portion 70 of the pump 7. The discharge oil passage 13 (13P, 13S) connects a discharge portion 71 of the pump 7 with a point between the shutoff valve 21 (21P, 21S) and the SOL/VIN 22 (22*a* to 22*d*) in the first oil passage 11. The check valve 130 is provided in the discharge oil passage 13 as a discharge valve for the pump 7, and permits the flow of brake fluid only in a direction from the discharge portion 71 toward the first oil passage 11. The communication valve 23P is provided in the discharge oil passage 13P which connects a downstream side of the check valve 130 with the first oil passage 11P of the P-line. The communication valve 23S is of normally-closed type (i.e., the communication valve 23S is closed when not energized), and is provided in the discharge oil passage 13S which connects the downstream side of the check valve 130 with the first oil passage 11S of the S-line. The first pressure-reducing oil passage 14 connects the suction oil passage 12 with a point between the check valve 130 and the communication valve 23P in the discharge oil passage 13P. The pressure-regulating valve 24 is provided in the first pressure-reducing oil passage 14, as a first pressure-reducing valve. The second pressure-reducing oil passage 15 (15*a* to 15*d*) connects the suction oil passage 12 with a point between the SOL/VIN 22 (22*a* to 22*d*) and the wheel cylinder 8 (8*a* to 8*d*) in the first oil passage 11. The pressure-reducing valve 25 (25*a* to 25*d*) is provided in the second pressure-reducing oil passage 15 (15*a* to 15*d*), as a second pressure-reducing valve. The first simulator oil passage 16 branches off from the first oil passage 11P as a branch oil passage, and is connected with a main chamber R1 of the stroke simulator 27. The stroke simulator valve 26 is provided in the first simulator oil passage 16, as a simulator shutoff valve. The second simulator oil passage 17 connects a sub-chamber (back-pressure chamber) R2 of the stroke simulator 27 with the suction oil passage 12.

In the hydraulic unit 6, a liquid pool 12*a* is provided at a portion at which a connecting pipe 10R extending from (the suction port 503 of) the master cylinder 5 is connected with the suction oil passage 12 of the hydraulic unit 6. That is, the liquid pool 12*a* is located at an upper side of the hydraulic unit 6 with respect to a gravitationally vertical direction. The discharge oil passages 13P and 13S constitute a communication passage which connects the first oil passage 11P of the P-line with the first oil passage 11S of the S-line. The pump 7 is connected through the communication passage (discharge oil passages 13P and 13S) and the first oil passages 11P and 11S with the wheel cylinders 8*a* to 8*d*. The pump 7 is a second hydraulic source which can increase hydraulic pressure of each wheel cylinder 8 by discharging brake fluid to the communication passage (discharge oil passages 13P and 13S). According to the present invention, at least one of the shutoff valve 21 (21P, 21S), the pressure-increasing valve 22 (22*a* to 22*d*), the communication valve 23P, the pressure-regulating valve 24 and the pressure-reducing valve 25 (25*a* to 25*d*) is a proportional control valve whose opening is adjusted according to electric-current supplied to a solenoid. In this embodiment, the pressure-reducing valves 25*c* and 25*d* for rear road-wheels RL and RR are the proportional control valves. The other valves, that is, the communication valve 23S, the remaining pressure-reducing valves 25*a* and 25*b* for front road-wheels FL and FR, and the stroke simulator valve 26 are ON-OFF valves each of which is switched between open and closed states in a binary-choice manner. It is noted that also these other valves can be provided as proportional control valves.

The shutoff valve 21 (21P, 21S) is provided on the first oil passage 11 (11P, 11S) and is located between the stroke simulator valve 26 and the wheel cylinder 8 (8*a* to 8*d*). Moreover, a bypass oil passage 120 (120*a* to 120*d*) is provided in parallel with the first oil passage 11 (11*a* to 11*d*) such that the bypass oil passage 120 (120*a* to 120*d*) bypasses the SOL/VIN 22 (22*a* to 22*d*). A check valve 220 (220*a* to 220*d*) is provided on the bypass oil passage 120 (120*a* to 120*d*), and allows brake fluid to flow in a direction from the wheel cylinder 8 toward the master cylinder 5.

The hydraulic sensor 91 for sensing the mater-cylinder pressure is provided between the master cylinder 5 and the shutoff valve 21P in the first oil passage 11P. It is noted that such a hydraulic sensor 91 may be provided between the master cylinder 5 and the shutoff valve 21S in the first oil passage 11S of the S-line. The hydraulic sensor 92 (92P, 92S) is provided between the shutoff valve 21 (21P, 21S) and the SOL/VIN 22 (22*a* to 22*d*) in the first oil passage 11 (11P, 11S). Each hydraulic sensor 92P, 92S senses hydraulic pressure at this location (i.e., wheel-cylinder hydraulic pressure). The hydraulic sensor 93 is provided in the discharge oil passage 13P between the communication valve 23P and the check valve 130 or the discharge portion 71 of the pump 7. The hydraulic sensor 93 senses hydraulic pressure at this location (i.e., discharge pressure of the pump 7).

The stroke simulator 27 includes a piston 27*a* and a spring 27*b*. A chamber R of the stroke simulator 27 is separated by the piston 27*a* into two chambers of the main chamber R1 and the sub-chamber R2. The piston 27*a* is movable inside the chamber R in an axial direction thereof. The spring 27*b* is installed inside the sub-chamber R2 in a compressed state The spring 27*b* is an elastic member which always biases the piston 27a toward the main chamber R1, i.e. in a direction that reduces volume of the main chamber R1 and enlarges volume of the sub-chamber R2. Under a state where the shutoff valves 21P and 21S are open, a first brake channel (the first oil passage 11) communicates the wheel cylinders 8a to 8d with the first and second fluid chambers 51P and 51S of the master cylinder 5. This first brake channel (the first oil passage 11) realizes a depressing-force brake (non-servo control) which produces wheel-cylinder pressures by use of the master-cylinder pressure generated by the pedal depressing force. On the other hand, under the state where the shutoff valves 21P and 21S are closed, a second brake channel (the suction oil passage 12, the discharge oil passage 13 and the like) communicates the reservoir 4 through the pump 7 with the wheel cylinders 8a to 8d. This second brake channel (the suction oil passage 12, the discharge oil passage 13 and the like) produces the wheel-cylinder pressures by use of hydraulic pressure generated by the pump 7. The second brake channel constitutes a so-called brake-by-wire system that realizes the servo control and the regenerative cooperation control etc.

Under the state where the shutoff valves 21P and 21S are closed such that the communication between the master cylinder 5 and the wheel cylinders 8a to 8d is blocked, the stroke simulator 27 produces or simulates a pedal stroke because at least brake fluid removed from the master cylinder 5 (the first fluid chamber 51P) to the first oil passage 11P flows through the first simulator oil passage 16 into the main chamber R1. That is, the stroke simulator 27 produces the pedal stroke by charging or discharging brake fluid from/to the master cylinder 5 in response to the brake manipulation (depression/retuning of the brake pedal 2) of the driver, under the state where the shutoff valves 21P and 21S are closed such that the communication between the master cylinder 5 and the wheel cylinders 8a to 8d is blocked and where the stroke simulator valve 26 is open such that the master cylinder 5 is in communication with the stroke simulator 27. Specifically, when hydraulic pressure (the master-cylinder pressure) higher than or equal to a predetermined level is applied to a pressure-receiving surface of the piston 27a in the main chamber R1, the piston 27a axially moves toward the sub-chamber R2 and thereby compresses the spring 27b so that the volume of the main chamber R1 is enlarged. Accordingly, brake fluid flows from the master cylinder 5 (the discharge port 501P) through oil passages (the first oil passage 11P and the first simulator oil passage 16) into the main chamber R1. At the same time, brake fluid is discharged from the sub-chamber R2 through the second simulator oil passage 17 to the suction oil passage 12. When the pressure inside the main chamber R1 decreases and becomes lower than the predetermined level, the piston 27a is returned to its initial position by the biasing force (elastic force) of the spring 27b. In such a way, the stroke simulator 27 simulates a liquid stiffness of the wheel cylinder 8 by sucking brake fluid from the master cylinder 5, so that a pedal-depression feeling is given to the driver.

Figure 10:
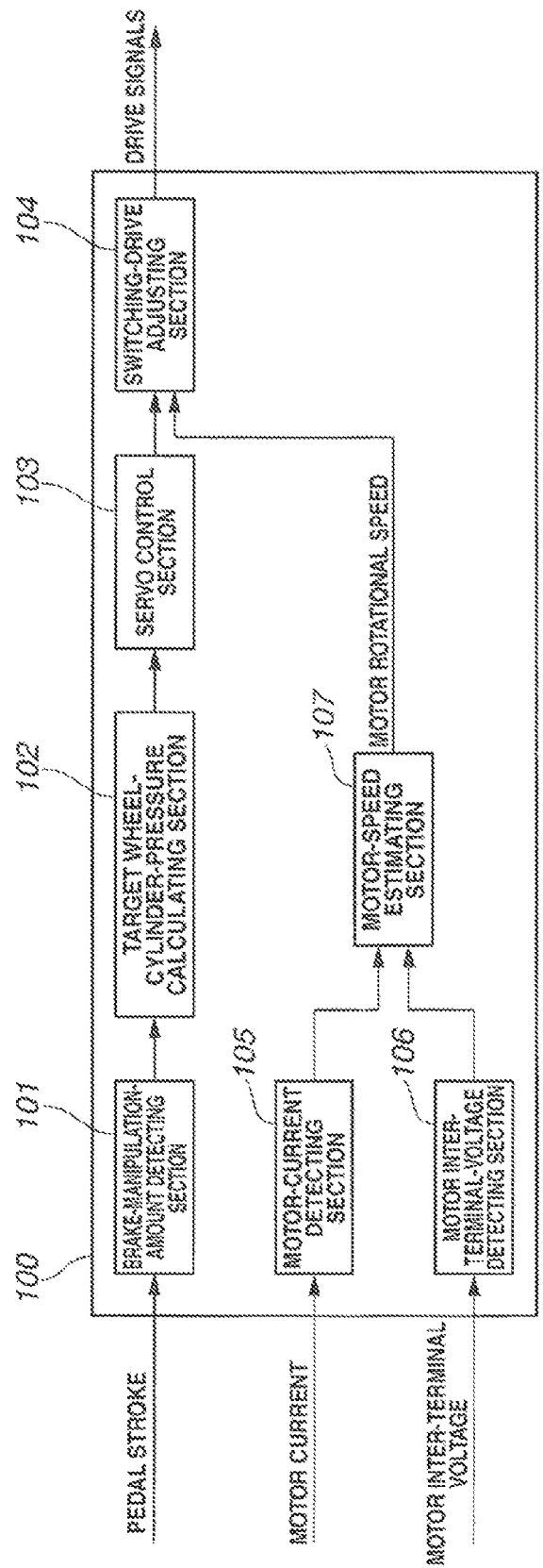
FIG. 10 is a control block diagram showing a control configuration of an ECU in the first embodiment.

FIG. 10 is a control block diagram showing a control configuration of the ECU 100 in the first embodiment. The ECU 100 constitutes a hydraulic control section that controls hydraulic pressure of the wheel cylinder 8 (8a to 8d) by operating the pump 7 and the electromagnetic valves 21-26 etc. on the basis of various information. The ECU 100 includes the brake-manipulation-amount detecting section 101, a target wheel-cylinder-pressure calculating section 102, a servo control section 103, a switching-drive adjusting section 104, a motor-current detecting section 105, a motor inter-terminal-voltage detecting section 106, and a motor-speed estimating section 107. The brake-manipulation-amount detecting section 101 detects the displacement (pedal stroke) of the brake pedal 2 as the brake manipulation amount by receiving detection values of the stroke sensor 90. The stroke sensor 90 is not limited to a sensor which directly senses the displacement of the brake pedal 2, and may be a sensor which senses a displacement of the pushrod 30. Alternatively, the brake manipulation amount may be detected based on detection value of a depressing-force sensor which is provided for sensing the depressing force of the brake pedal 2. That is, also an appropriate variable other than the pedal stroke can be used as the brake manipulation amount for an after-mentioned controls.

The target wheel-cylinder-pressure calculating section 102 calculates a target wheel-cylinder hydraulic pressure. Specifically, the target wheel-cylinder hydraulic pressure which realizes a predetermined servo rate (boost rate), i.e. realizes an ideal relational characteristic between the pedal stroke and the required brake fluid pressure of the driver (the required vehicle deceleration G of the driver) is calculated based on the detected pedal stroke. In this embodiment, the ideal relational characteristic for the calculation of the target wheel-cylinder hydraulic pressure is, for example, a predetermined relational characteristic between the pedal stroke and the hydraulic pressure (brake fluid pressure) of wheel cylinder which is realized by a brake apparatus including a normal-size engine negative-pressure booster without the link mechanism 3 when the engine negative-pressure booster operates. The target wheel-cylinder-pressure calculating section 102 calculates the target wheel-cylinder hydraulic pressure in relation to the regenerative braking force when the regenerative cooperation control is performed. Specifically, the target wheel-cylinder-pressure calculating section 102 calculates the target wheel-cylinder hydraulic pressure such that a sum of the regenerative braking force inputted from a control unit of the regenerative braking device and the hydraulic braking force corresponding to the target wheel-cylinder hydraulic pressure satisfies the desired vehicle deceleration of the driver. Moreover, at the time of VDC, the target wheel-cylinder-pressure calculating section 102 calculates the target wheel-cylinder hydraulic pressure for each road-wheel FL to RR on the basis of detected running-state parameters (such as lateral acceleration) of the vehicle such that a desired running state of the vehicle is attained.

When the depressing-force brake is should be done, the shutoff valve 21 (21P, 21S) is opened such that the hydraulic unit 6 is brought into a state where the master-cylinder pressure (the first channel) can produce the wheel-cylinder hydraulic pressure. Thereby, the depressing-force brake is realized. At this time, the communication between the master cylinder 5 and the stroke simulator 27 is blocked by closing the stroke simulator valve 26. The servo control section 103 closes the shutoff valve 21 (21P, 21S) such that the hydraulic unit 6 is brought into a state where the pump 7 (the second channel) can produce the wheel-cylinder hydraulic pressure. Thereby, the servo control is performed such that the respective actuators of the hydraulic unit 6 are controlled to realize the target wheel-cylinder hydraulic pressure. At this time, the master cylinder 5 is communicated with the stroke simulator 27 by opening the stroke simulator valve 26.

The servo control section 103 switches between the depressing-force brake and the servo control by controlling operations of the hydraulic unit 6, on the basis of the calculated target wheel-cylinder hydraulic pressure. Specifically, the servo control section 103 permits the depressing-force brake to generate the wheel-cylinder hydraulic pressure if the calculated target wheel-cylinder hydraulic pressure is lower than or equal to a predetermined value, for example, when the brake-manipulation-amount detecting section 101 detects a start of the brake manipulation. On the other hand, if the target wheel-cylinder hydraulic pressure calculated during the depressing manipulation of the brake pedal becomes higher than the predetermined value, the servo control section 103 generates the wheel-cylinder hydraulic pressure. Thus, in the apparatus 1, the first channel produces the wheel-cylinder hydraulic pressure for each road-wheel in an early stage of the braking over which the brake manipulation amount is relatively small, i.e., in a predetermined brake manipulating region (low-pressure region) subsequent to the start of the brake manipulation. On the other hand, in a predetermined brake manipulating region (high-pressure region) over which the brake manipulation amount is relatively large, the second channel produces the wheel-cylinder hydraulic pressure to realize the servo function. Therefore, the apparatus 1 in this embodiment can improve an energy efficiency as compared with a brake apparatus that always operates a servo unit in accordance with the brake manipulation of the driver.

Operations in First Embodiment

Figure 2:
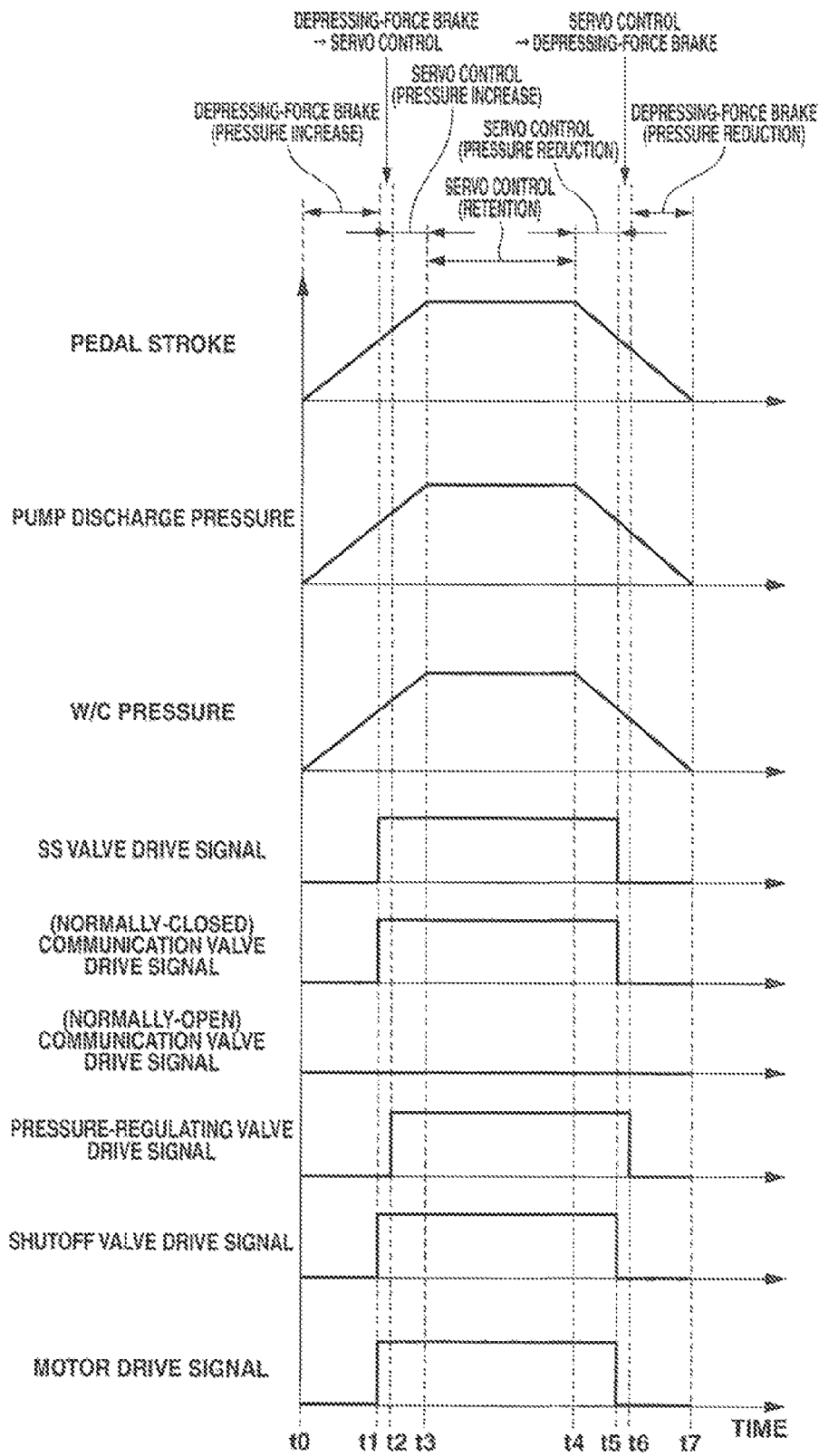
FIG. 2 is a time chart showing time variations of respective hydraulic pressures and operating states of respective actuators in a hydraulic unit in the first embodiment.
Figure 3:
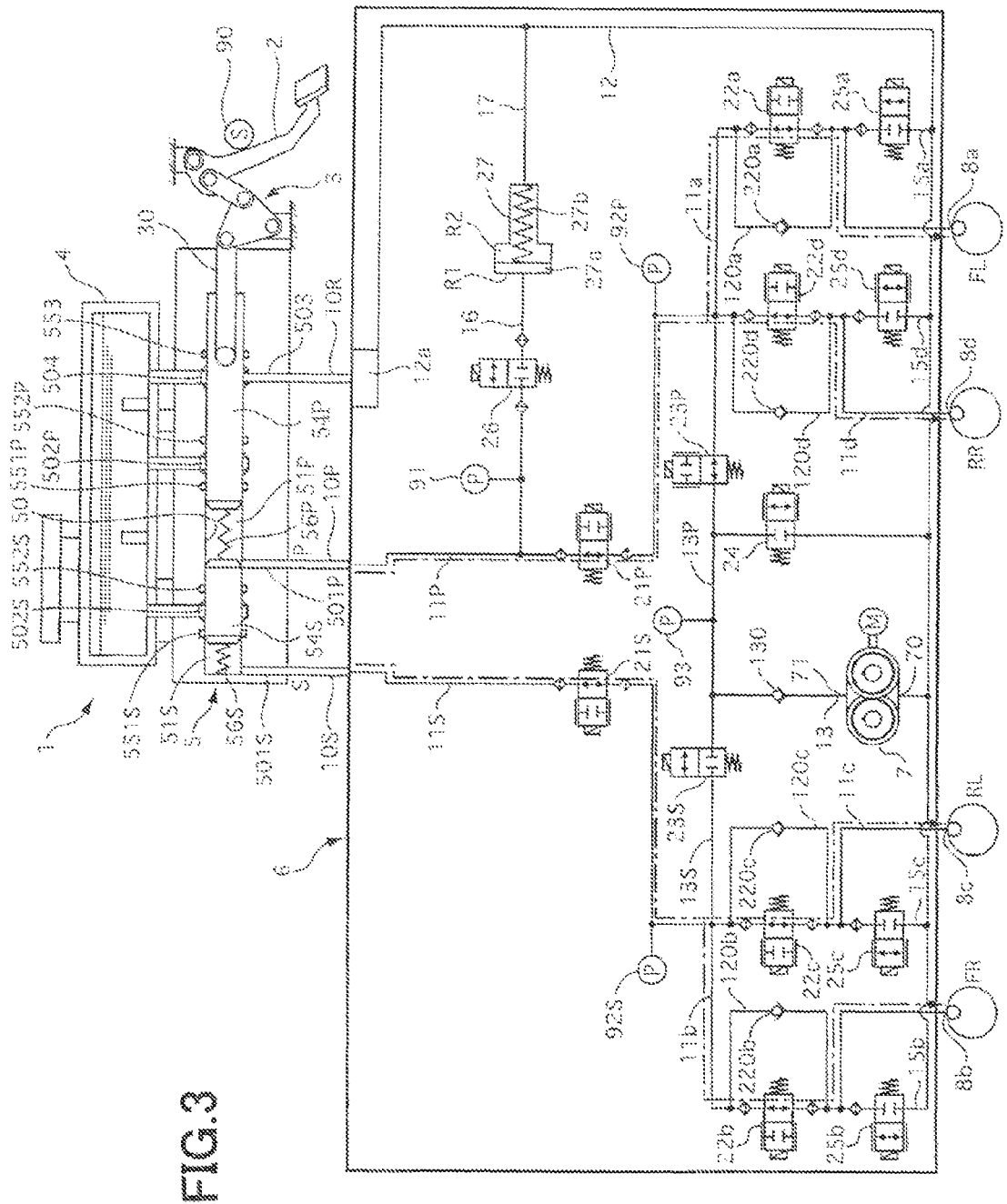
FIG. 3 exemplifies operating states of the respective actuators in the hydraulic unit by use of a circuit diagram similar to FIG. 1.
Figure 4:
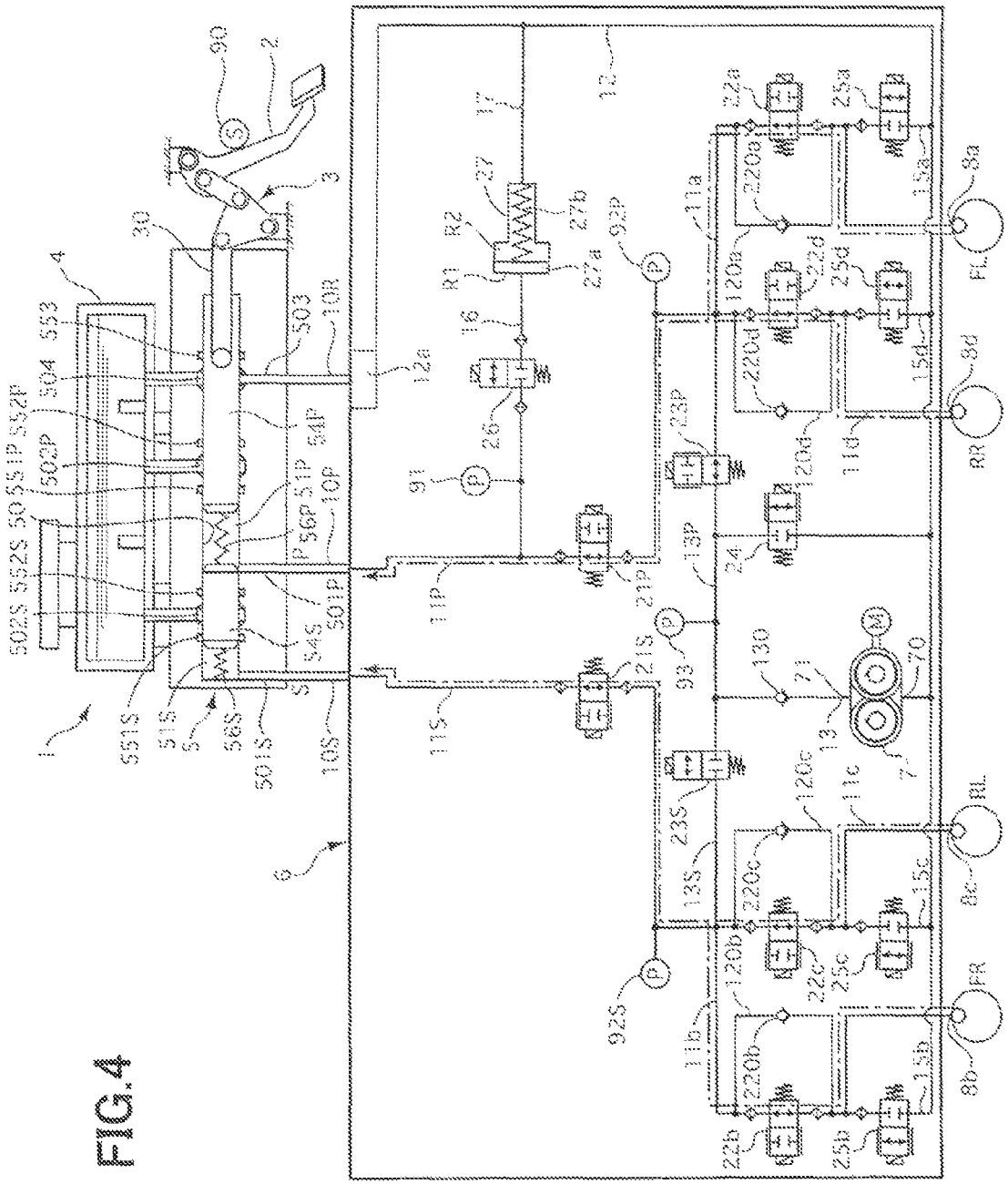
FIG. 4 exemplifies operating states of the respective actuators in the hydraulic unit by use of a circuit diagram similar to FIG. 1.

Next, operations according to the above-mentioned structures will now be explained. FIG. 2 is a time chart showing time variations in the respective hydraulic pressures and the operating states of the actuators. A case (t1~t5) where not only the depressing-force brake but also the servo control are performed is shown continuously with a case (t0~t1, t5~t7) where only the depressing-force brake is performed. FIGS. 3 to 8 exemplify the operating states of the respective actuators in the hydraulic unit 6 by use of circuit diagrams similar to FIG. 1. Each of FIGS. 3 to 8 shows a flow of brake fluid by alternate long and short dash line.

At first, the case (t0~t1, t5~t7) where only the depressing-force brake is performed will now be explained. Before time point t0, i.e. when the braking is not applied; all of the pedal stroke, the master-cylinder pressure and the wheel-cylinder pressures are substantially equal to 0. At this time, the respective actuators are not energized, and hence remain in an initial condition shown in FIG. 1. At time point t0, the driver starts to depress the brake pedal 2. Then, the pedal stroke is increased. The servo control section 103 causes the depressing-force brake to produce the wheel-cylinder pressures until time point t1 at which the target wheel-cylinder hydraulic pressure calculated based on the pedal stroke becomes higher than the predetermined value. At time point t4, the driver starts to return the brake pedal 2. Then, the pedal stroke is reduced. The servo control section 103 causes the depressing-force brake to produce the wheel-cylinder pressures from time point t5 at which the target wheel-cylinder hydraulic pressure calculated based on the pedal stroke becomes lower than the predetermined value. The master-cylinder pressure and the wheel-cylinder pressure are reduced according to the reduction of the pedal stroke.

Because the target wheel-cylinder hydraulic pressure calculated based on the pedal stroke becomes higher than the predetermined value at time point t1, the servo control section 103 produces the wheel-cylinder pressures by way of the servo control instead of the depressing-force brake. Basically, the servo control is started in the following manner by the servo control section 103.

If the pump 7 and the pressure-regulating valve 24 are driven concurrently with each other in order to switch to the servo control, the pressure-regulating valve 24 opens before the discharge of the pump 7 because a responsivity of the pressure-regulating valve 24 is quicker than a responsivity of the pump 7. Thereby, in this case, the wheel-cylinder pressure is reduced.

Figure 9:
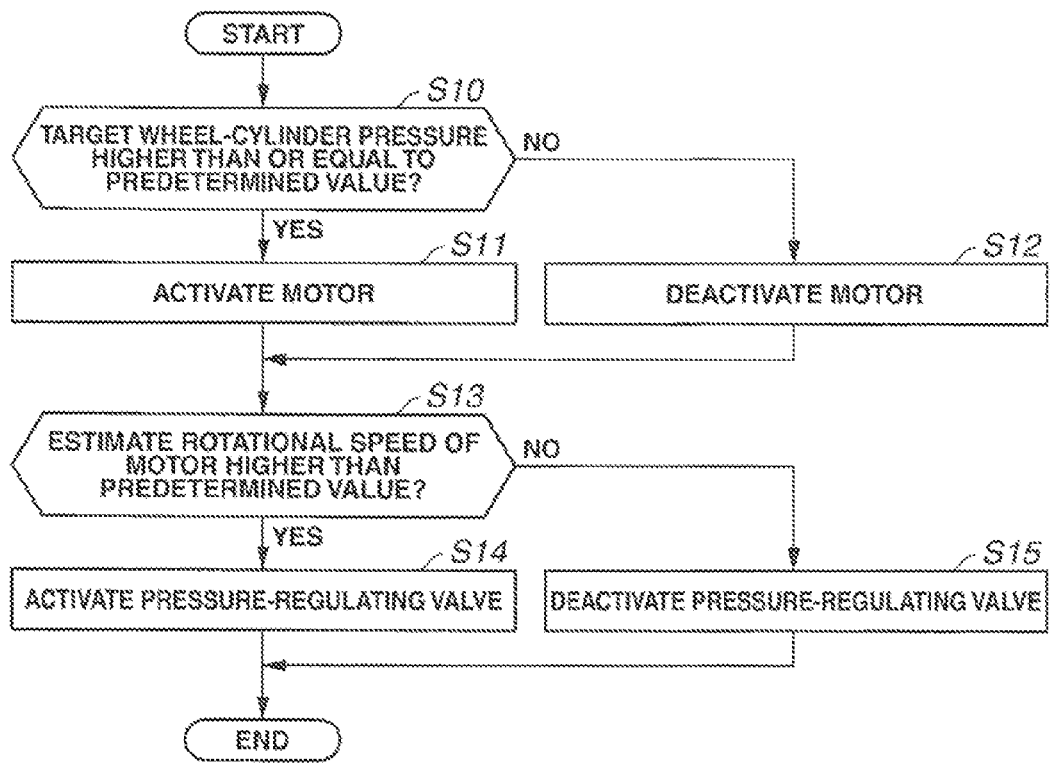
FIG. 9 is a flowchart showing a control content which is executed by a switching-drive adjusting section in the first embodiment.

Therefore, the switching-drive adjusting section 104 prevents the reduction of the wheel-cylinder pressure for a time range from time point t1 to time point t2. FIG. 9 is a flowchart showing a control content which is executed by the switching-drive adjusting section 104 in the first embodiment. When the target wheel-cylinder hydraulic pressure is lower than or equal to the predetermined value (NO at step S10), the motor 60 is not activated or driven. On the other hand, when the target wheel-cylinder hydraulic pressure is higher than the predetermined value (YES at step S10), the motor 60 is driven.

Moreover, when an estimate rotational speed of the motor 6 is lower than or equal to a predetermined value (NO at step S13), the pressure-regulating valve 24 is not driven. When the estimate rotational speed of the motor 6 is higher than this predetermined value (YES at step S13), the pressure-regulating valve 24 is driven. The motor-speed estimating section 107 calculates the rotational speed of the motor 60 from the following formula.

$$\{V(t)-Lm*dI/dt(t)-Rm*I(t)\}/K=w(t)$$

Wherein, $V(t)$ denotes a voltage between terminals of the motor 60, $Lm$ denotes an inductance of coil, $Rm$ denotes a coil resistance, $I(t)$ denotes an electric-current of the motor 60, $K$ denotes a back electromotive-force constant, and $w(t)$ denotes the rotational speed of the motor 60. $V(t)$ can be detected by the motor inter-terminal-voltage detecting section 106 of the ECU. $I(t)$ can be detected by the motor-current detecting section 105. Accordingly, during the time range from t1 to t2, the pressure-regulating valve 24 is opened after the pump 7 has discharged. Hence, the reduction of each wheel-cylinder pressure can be prevented.

Because the target wheel-cylinder hydraulic pressure calculated based on the pedal stroke becomes lower than or equal to the predetermined value at time point t5, the servo control section 103 causes the depressing-force brake to produce the wheel-cylinder pressures instead of the servo control.

If the pump 7 and the pressure-regulating valve 24 are deactivated (made to become in not-energized state) concurrently with each other in order to switch to the depressing-force brake, the pressure-regulating valve 24 closes before the discharge of the pump 7 stops, because the responsivity of the pressure-regulating valve 24 is quicker than the responsivity of the pump 7. Thereby, in this case, each wheel-cylinder pressure is enlarged.

Therefore, in the first embodiment, during a time range from t5 to t6, the switching-drive adjusting section 104 closes the pressure-regulating valve 24 after the discharge of the pump 7 has stopped. Hence, the enlargement of the wheel-cylinder pressure can be prevented.

Figure 5:
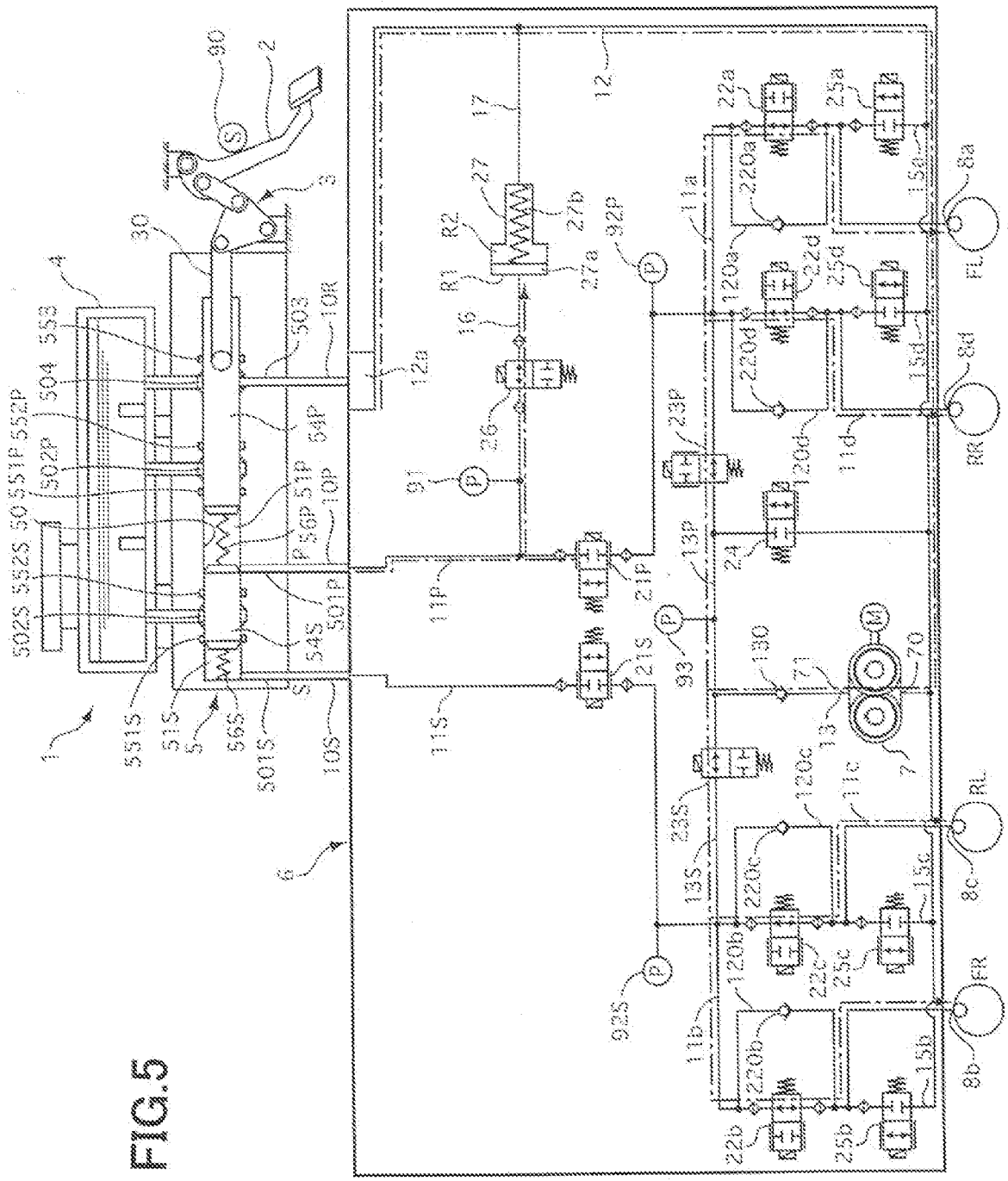
FIG. 5 exemplifies operating states of the respective actuators in the hydraulic unit by use of a circuit diagram similar to FIG. 1.
Figure 6:
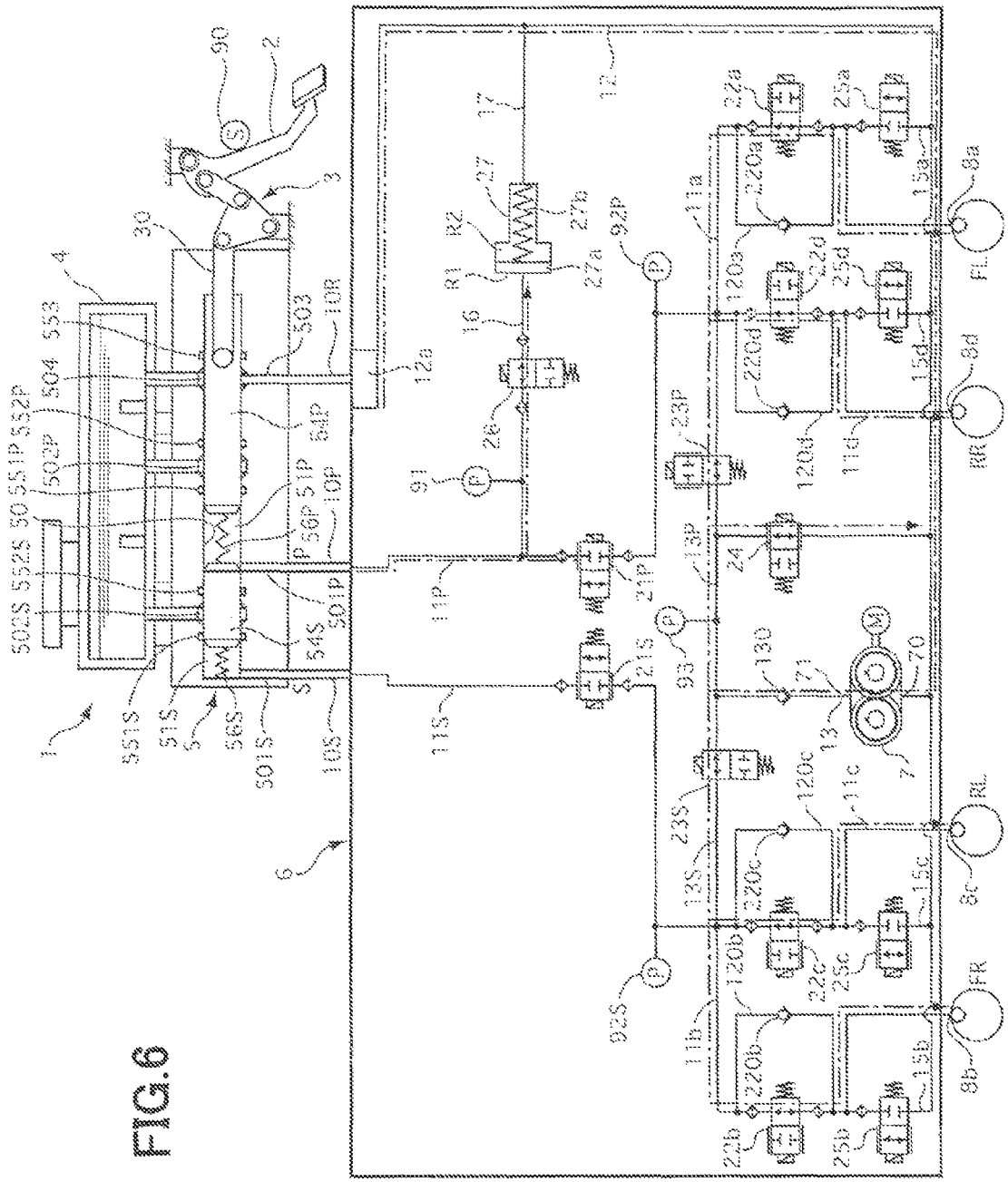
FIG. 6 exemplifies operating states of the respective actuators in the hydraulic unit by use of a circuit diagram similar to FIG. 1.
Figure 7:
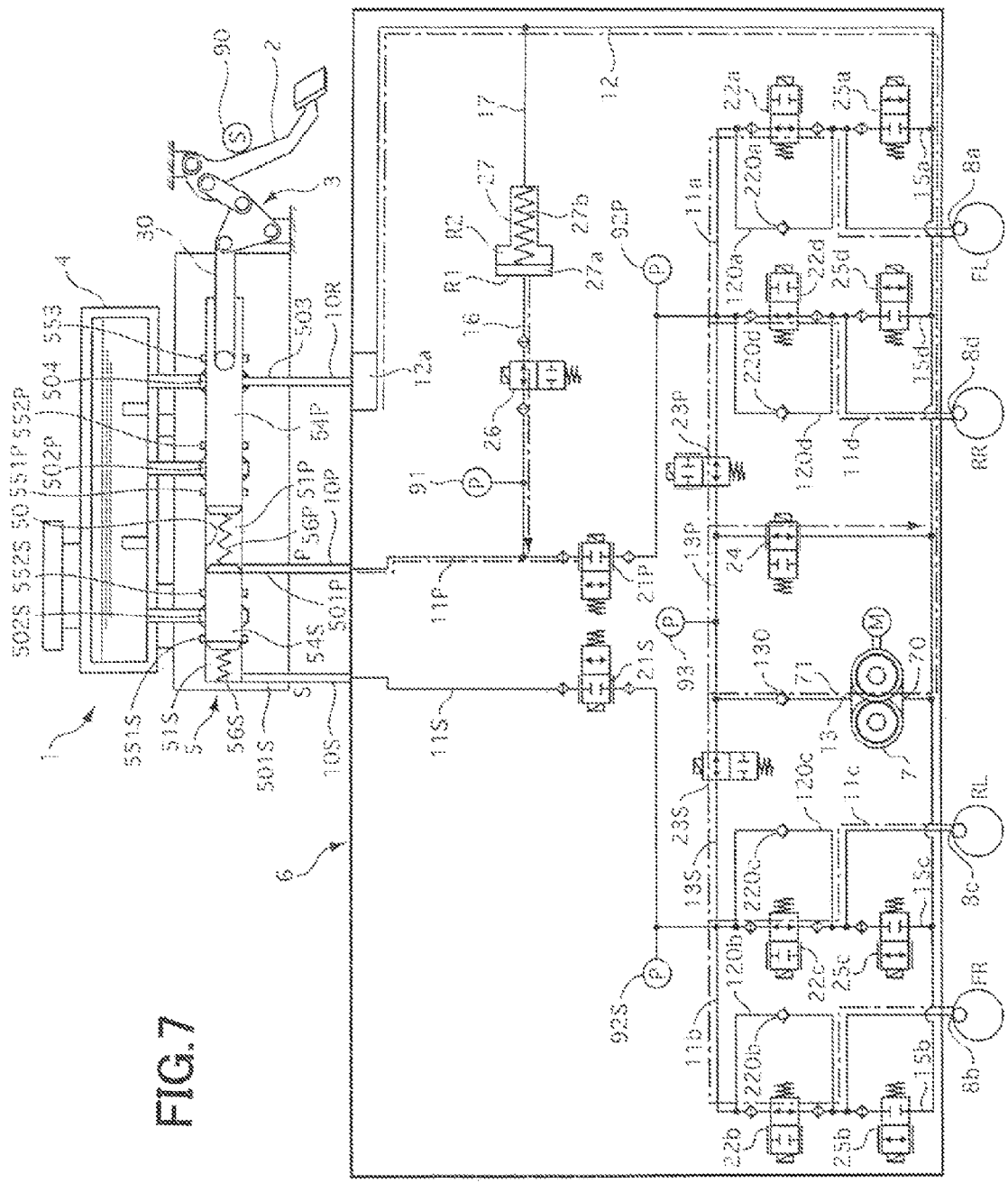
FIG. 7 exemplifies operating states of the respective actuators in the hydraulic unit by use of a circuit diagram similar to FIG. 1.
Figure 8:
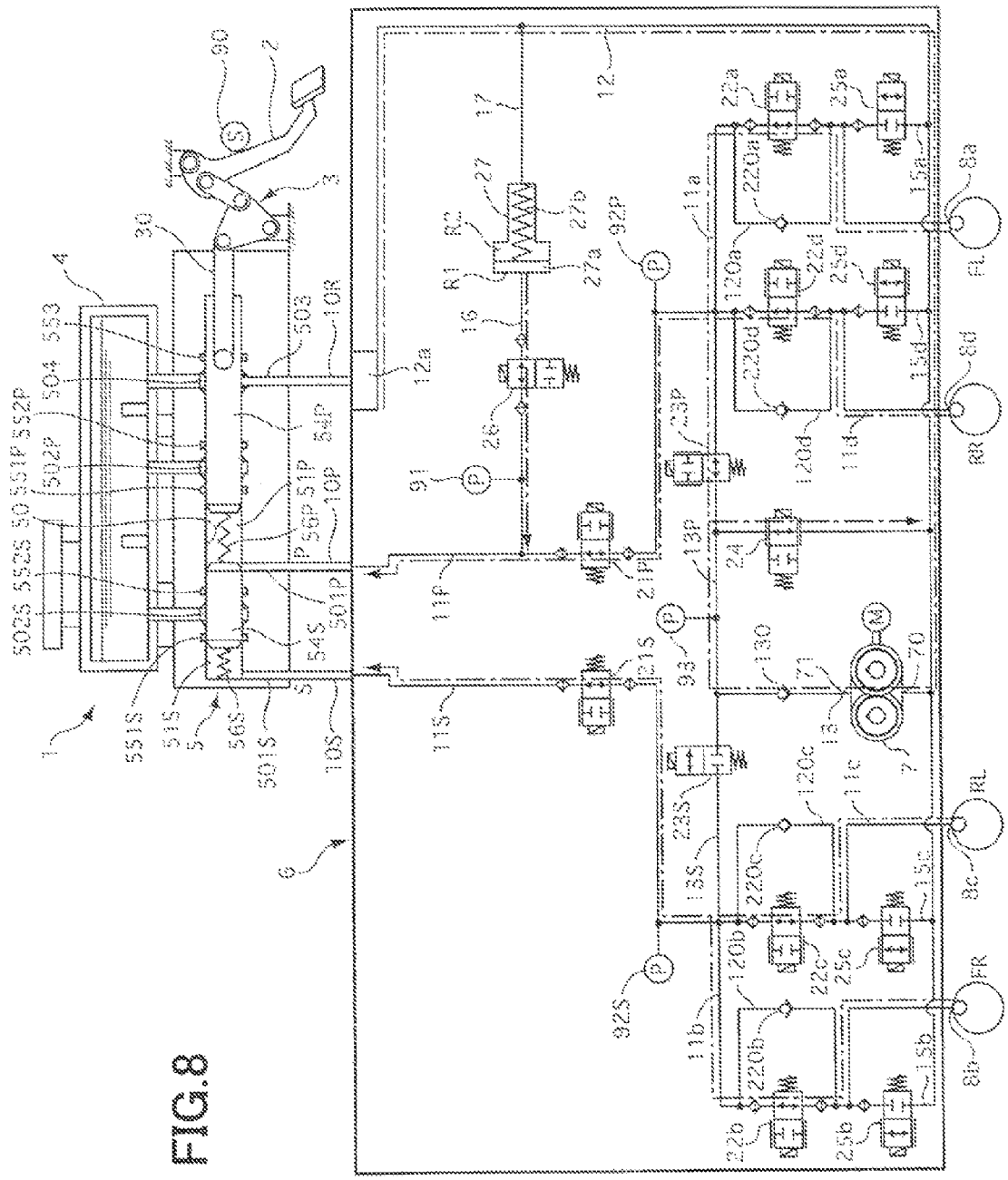
FIG. 8 exemplifies operating states of the respective actuators in the hydraulic unit by use of a circuit diagram similar to FIG. 1.

For a time range from t1 to t3, the pedal stroke continues to increase with the depression of the brake pedal 2 by the driver. In order to realize the target wheel-cylinder hydraulic pressure calculated based on the increased pedal stroke, the servo control section 103 controllably increases the wheel-cylinder pressures by controlling an opening (degree) of the pressure-regulating valve 24 as shown in FIG. 5. For a rime range from t3 to t4, the driver maintains the depression amount (pedal stroke) of the brake pedal 2. In order to realize the target wheel-cylinder hydraulic pressure calculated based on this pedal stroke, the servo control section 103 controllably maintains the wheel-cylinder pressures by controlling the opening (degree) of the pressure-regulating valve 24 as shown in FIG. 6. For a time range from t4 to t5, the driver continues to return the brake pedal 2. In order to realize the target wheel-cylinder hydraulic pressure calculated based on the pedal stroke, the servo control section 103 controllably reduces the wheel-cylinder pressures by controlling the opening (degree) of the pressure-regulating valve 24 as shown in FIG. 7. From time point t1 to time point t5, the hydraulic pressure inside the stroke simulator 27 increases and decreases according to the increase/decrease of the master-cylinder pressure.

As shown in FIGS. 5 to 7, the servo control section 103 drives the pump 7, opens the stroke simulator valve 26, closes the shutoff valve 21 (21P, 21S), opens the SOL/V IN 22 (22a to 22d), opens the communication valve 23 (23P, 23S), opens the pressure-regulating valve 24, and closes the pressure-reducing valve 25 (25a to 25d). Under this condition, the servo control section 103 controls the opening (degree) of the pressure-regulating valve 24 on the basis of detection values of the hydraulic sensors 92P, 92S and 93 such that each wheel-cylinder pressure becomes equal to the target wheel-cylinder hydraulic pressure. Because the shutoff valve 21 (21P, 21S) is closed so as to block the communication between the master cylinder 5 and the wheel cylinders 8a to 8d, the wheel-cylinder pressures can be easily controlled independently from the pedal manipulation of the driver. In this embodiment, basically, the wheel-cylinder pressures are adjusted by adjusting the pressure-regulating valve 24, without adjusting the pump 7. Because the pressure-regulating valve 24 is a proportional control valve, a fine control can be attained so that a smooth control for the wheel-cylinder pressure can be realized in this embodiment.

However, the configuration according to the present invention is not limited to this. For example, the rotational speed (discharge amount) of the pump 7 may be adjusted. Moreover, in order to adjust the wheel-cylinder pressures, an opening degree of the pressure-reducing valve 25 (25a to 25d) may be adjusted instead of the pressure-regulating valve 24 or together with the pressure-regulating valve 24. Moreover, the pump 7 may be stopped when the wheel-cylinder pressure is being reduced or maintained.

Because the stroke simulator valve 26 is opened, brake fluid flows from the master cylinder 5 into the stroke simulator 27 by the pedal-depressing manipulation of the driver, as shown in FIG. 6. Hence, a manipulation feeling of the brake pedal 2 is simulated to enable the pedal stroke even when the wheel-cylinder pressures are controlled independently from the pedal manipulation of the driver. Thereby, the feeling of the driver at the time of pedal-depressing manipulation is improved. When the driver returns the brake pedal 2, brake fluid returns from the stroke simulator 27 into the master cylinder 5. At time point t7, the pedal stroke becomes equal to 0, and therefore, the depressing-force brake ends. Accordingly, the control state becomes in the same state as time point t0.

Figure 11:
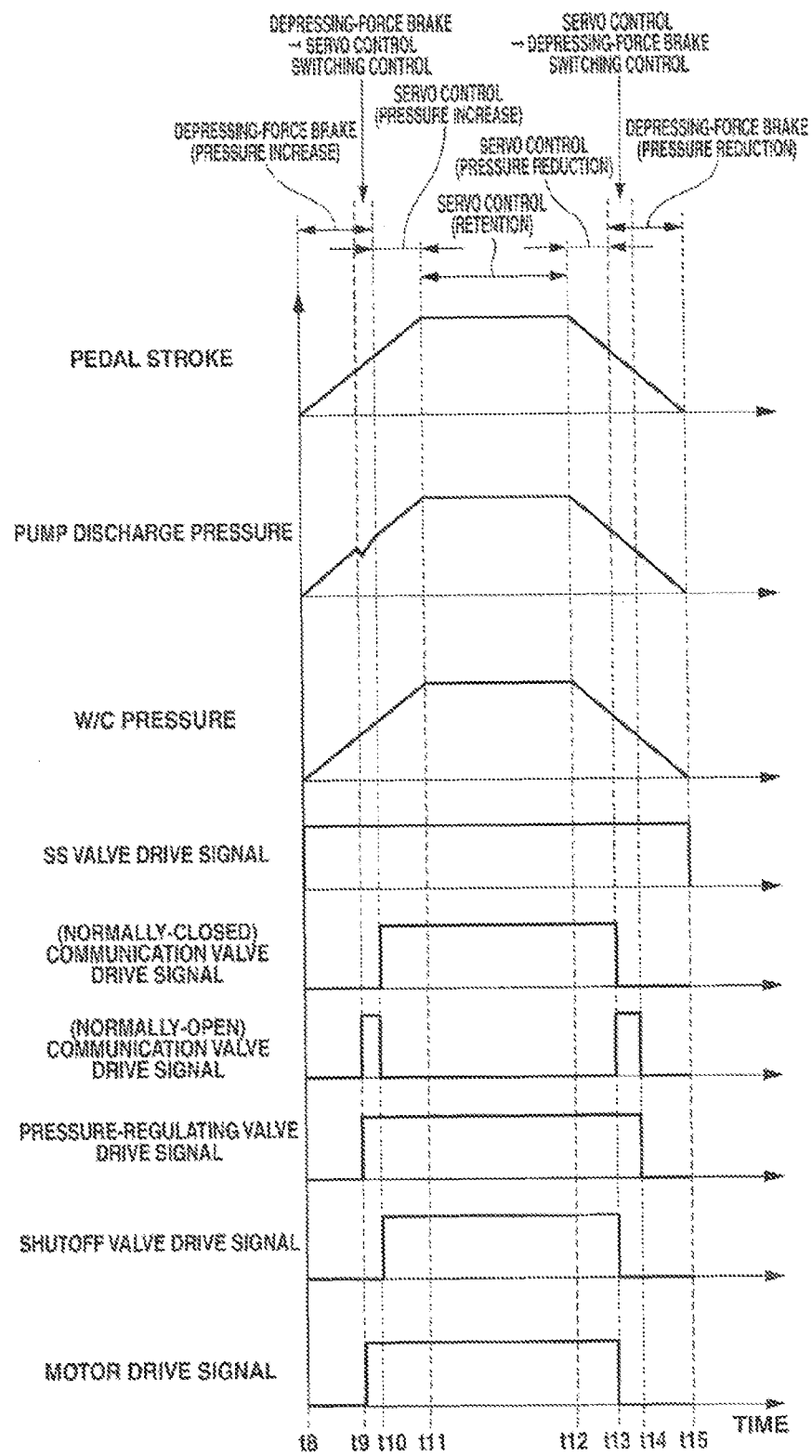
FIG. 11 is a time chart showing time variations of respective hydraulic pressures and operating states of the respective actuators in the hydraulic unit in the first embodiment.
Figure 12:
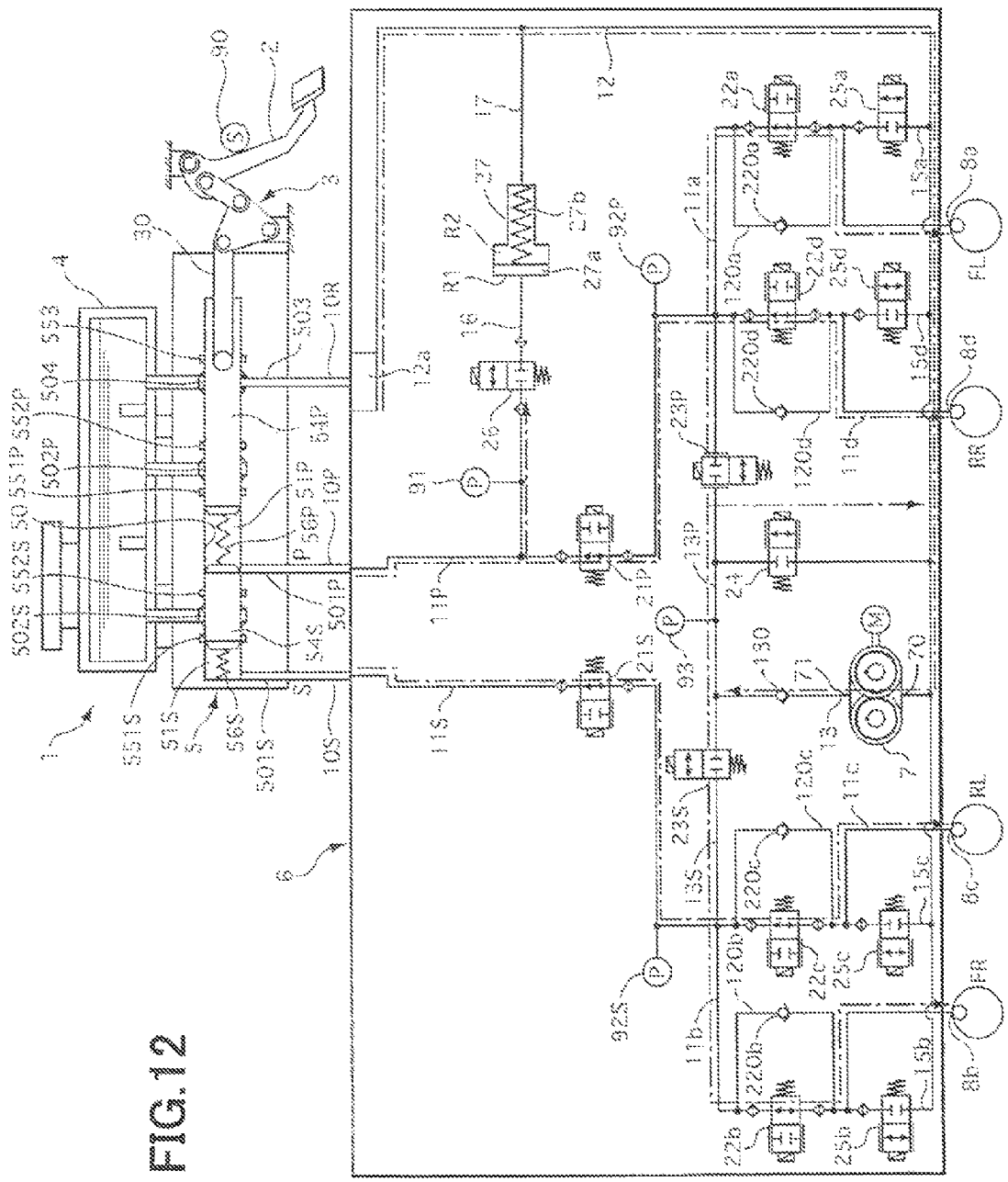
FIG. 12 exemplifies operating states of the respective actuators and respective hydraulic pressures, which occur between time point t9 and time point t10 in the first embodiment.
Figure 13:
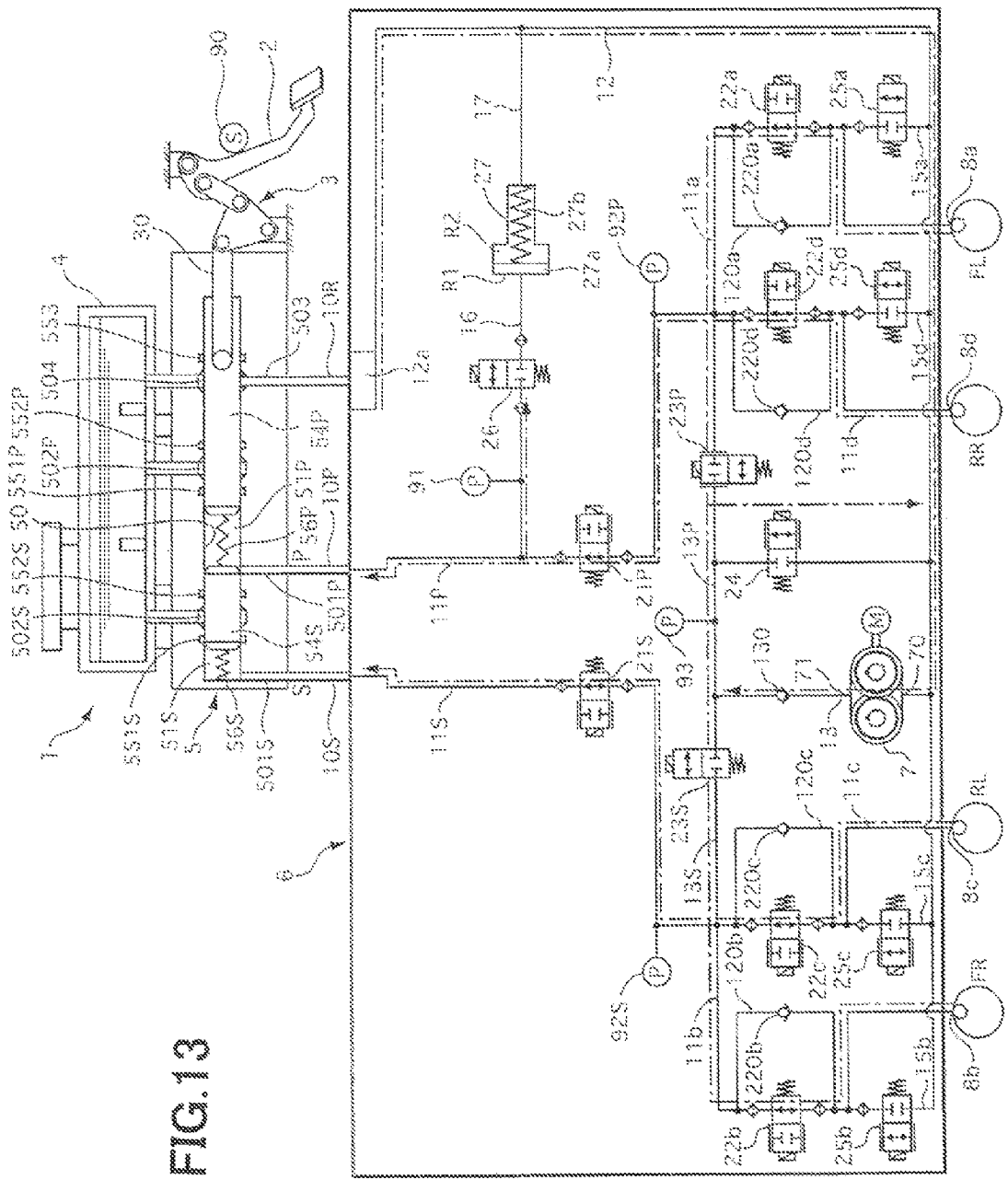
FIG. 13 exemplifies operating states of the respective actuators and respective hydraulic pressures, which occur between time point t13 and time point t14 in the first embodiment.

FIG. 11 is a time chart showing time variations in the respective hydraulic pressures and the operating states of the actuators. In this time chart, a case (t10~t13) where not only the depressing-force brake but also the servo control are performed is shown continuously with a case (t8~t10, t13~t15) where only the depressing-force brake is performed. FIG. 12 exemplifies an operating state which occurs between time point t9 and time point t10. FIG. 13 exemplifies an operating state which occurs between time point t13 and time point t14.

In the example shown in FIG. 11, predetermined values "A" and "B" are set for the target wheel-cylinder hydraulic pressure. The predetermined value "B" is a threshold above which the servo control should be performed. The predetermined value "A" is smaller than the predetermined value "B". The predetermined values "A" and "B" define a time range for which the switching operation between the depressing-force brake and the servo control is carried out.

That is, in the case of switch from the depressing-force brake to the servo control, the predetermined value "A" functions as a threshold at which a preparation period for the switch from the depressing-force brake to the servo control starts. At time point t9 at which the target wheel-cylinder hydraulic pressure reaches the predetermined value "A", the normally-open communication valve 23P is activated (energized) so that the pump 7 and the pressure-regulating valve 24 are hydraulically separated from the wheel cylinders 8a to 8d. At the same time, the pump 7 and the pressure-regulating valve 24 are activated such that the discharge pressure of the pump 7 is adjusted by the pressure-regulating valve 24 to become equal to the target wheel-cylinder hydraulic pressure. Then, when the target wheel-cylinder hydraulic pressure reaches the predetermined value "B" (at time point t10), the normally-open communication valve 23P is deactivated concurrently with an activation of the normally-closed communication valve 23S so that the pump 7 and the pressure-regulating valve 24 are hydraulically connected with the wheel cylinders 8a to 8d. At the same time, the normally-open shutoff valve 21 (21P, 21S) is activated. Hence, at time point t10, a necessary hydraulic pressure for the servo control has been produced by the pump 7 although the response of the pump 7 is relatively slow. In this example shown in FIG. 11, in consideration of the difference in responsivity between the pressure-regulating valve 24 and the pump 7, the response of the pump 7 is completed to produce the necessary hydraulic pressure for the servo control before the start of the servo control. That is, the switching operation from the depressing-force brake to the servo control is carried out for the time range from time point t9 given by the predetermined value "A" to time point t10 given by the predetermined value "B". The switching operation from the servo control to the depressing-force brake is carried out for a time range from time point t13 given by the predetermined value "B" to time point t14 substantially given by the predetermined value "A".

Figure 14:
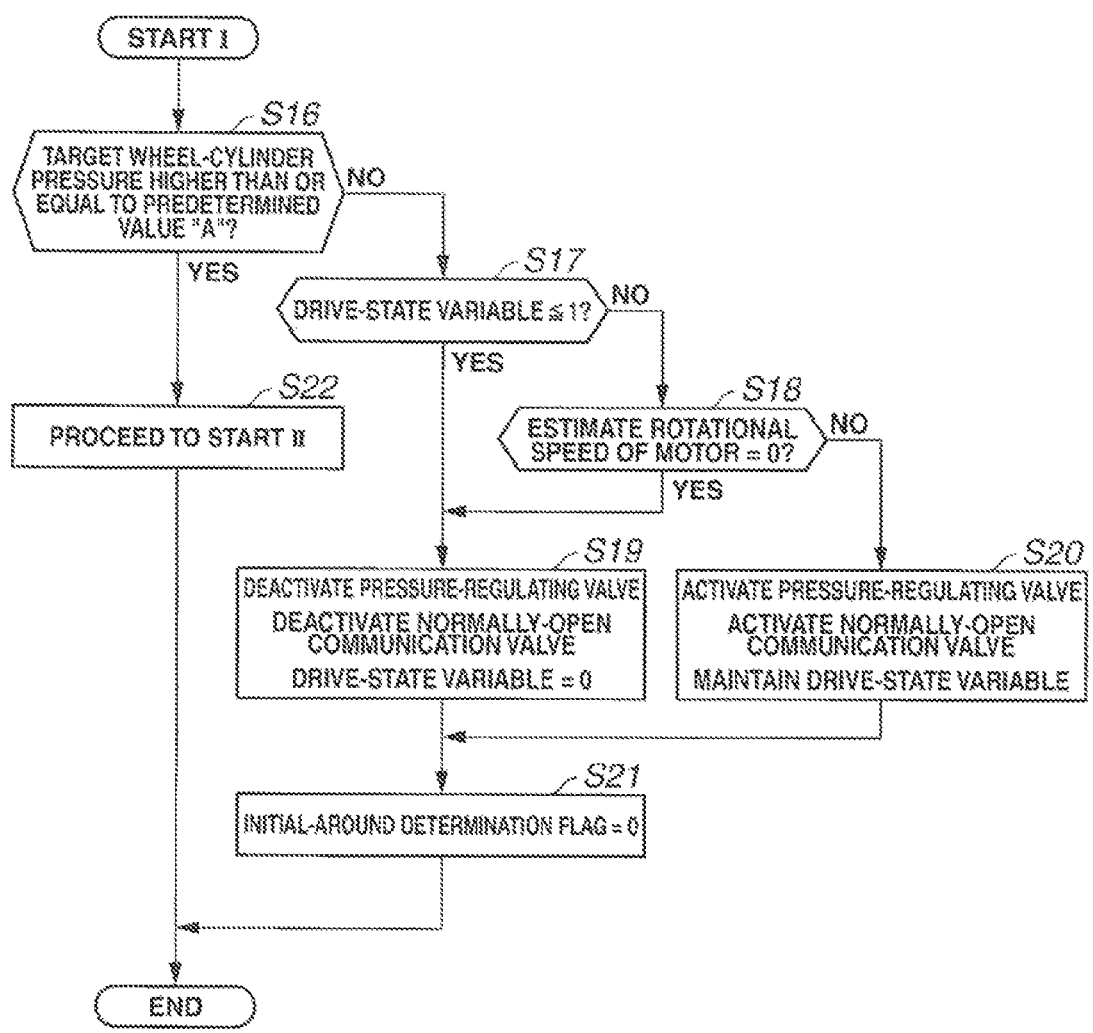
FIG. 14 is a flowchart showing a control processing which is executed by the switching-drive adjusting section in the first embodiment.
Figure 15:
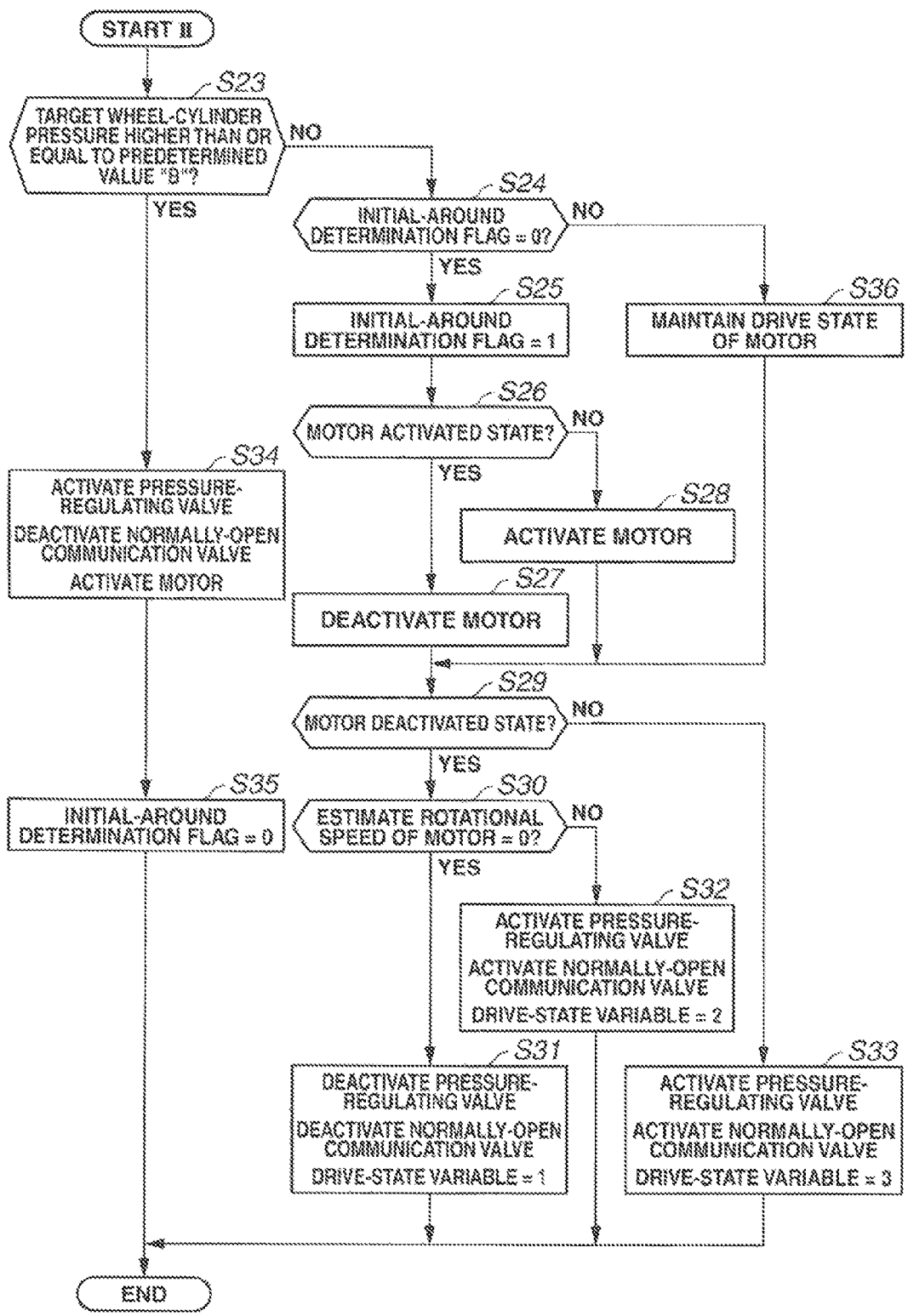
FIG. 15 is a flowchart showing the control processing which is executed by the switching-drive adjusting section in the first embodiment.

FIGS. 14 and 15 are flowcharts showing a processing which is executed by the switching-drive adjusting section 104. When the depressing-force brake is in execution as in time range t8-t9, the target wheel-cylinder hydraulic pressure is lower than the predetermined value "A" (NO at step S16). Moreover, a drive-state variable which shows a previous drive state (last-time-around drive state) is smaller than or equal to 1 (YES at step S17). Hence, at step S19, the pressure-regulating valve 24 and the communication valve 23P are deactivated. Moreover, the drive-state variable is set to 0. Then, at step S21, an initial-around determination flag is reset to 0.

In time range t9-t10, the depressing-force brake is in execution while a switching control (switching operation) between the depressing-force brake and the servo control is executed by use of the pump 7, the pressure-regulating valve 24 and the communication valve 23. In the flowcharts of FIGS. 14 and 15, the target wheel-cylinder hydraulic pressure is higher than or equal to the predetermined value "A" (YES at step S16), and is lower than the predetermine value "B" (NO at step S23). If the initial-around determination flag is equal to 0 (YES at step S24), the initial-around determination flag is set to 1 at step S25. When a transition from time range t8-t9 to time range t9-t10 starts, the motor 60 is in the deactivated state (NO at step S26). Hence, the motor 60 is activated and driven at step S28. Then, because the motor 60 is in the activated (energized) state (NO at step S29), the pressure-regulating valve 24 and the communication valve 23P are activated at step S33. Moreover, at step S33, the drive-state variable is set to 3.

For time range t10-t13, the servo control is executed. In the flowcharts of FIGS. 14 and 15, the target wheel-cylinder hydraulic pressure is higher than or equal to the predetermined value "A" (YES at step S16), and is higher than or equal to the predetermine value "B" (YES at step S23). The pressure-regulating valve 24 and the motor 60 are activated, and the communication valve 23P is deactivated at step S34 because of the servo control. Then, the initial-around determination flag is reset to 0 at step S35.

In time range t13-t14, the servo control is changed into the depressing-force brake, and also the switching control therebetween is executed by use of the pump 7, the pressure-regulating valve 24 and the communication valve 23. In the flowcharts of FIGS. 14 and 15, the target wheel-cylinder hydraulic pressure is higher than or equal to the predetermined value "A" (YES at step S16), and is lower than the predetermine value "B" (NO at step S23). If the initial-around determination flag is equal to 0 (YES at step S24), the initial-around determination flag is set to 1 at step S25. When a transition from time range t10-t13 to time range t13-t14 starts, the motor 60 is in the activated state (YES at step S26). Hence, the motor 60 is deactivated at step S27. Then, when the estimate rotational speed of the motor 60 is not equal to zero (NO at step S30) although the motor 60 is in the deactivated (not-energized) state (YES at step S29), the pressure-regulating valve 24 and the communication valve 23P are activated at step S32. Moreover, at step S32, the drive-state variable is set to 2. On the other hand, when the estimate rotational speed of the motor 60 is equal to zero (YES at step S30), the pressure-regulating valve 24 and the communication valve 23P are deactivated at step S31. Moreover, at step S31, the drive-state variable is set to 1.

In time range t14-t15, the driver returns the brake pedal 2 under the depressing-force brake. At this time, the target wheel-cylinder hydraulic pressure becomes lower than the predetermined value "A" (NO at step S16). If the drive-state variable which shows the previous drive state is larger than 1 (NO at step S17) and also the estimate rotational speed of the motor 60 is not equal to zero (NO at step S18), the pressure-regulating valve 24 and the communication valve 23P are activated at step S20. Moreover, at step S20, the drive-state variable is maintained without any change. Then, at step S21, the initial-around determination flag is reset to 0.

Advantageous Effects According to First Embodiment

The apparatus 1 is not equipped with the engine negative-pressure booster. Instead of the engine negative-pressure booster, the apparatus 1 uses the hydraulic unit 6 as an energy source which compensates for the shortage of the brake manipulating force. Therefore, this apparatus 1 is more suitable for an electrically-driven vehicle. On the other hand, in a case that the apparatus 1 is applied to an engine vehicle, a fuel economy can be improved. Generally, lots of brake apparatuses include the hydraulic unit (6) for the ABS and VDC. Hence, in the first embodiment, the number of components can be reduced resulting in cost reduction. Moreover, the configuration of brake apparatus can be simplified to enhance a mountability on the vehicle. Furthermore, downsizing and weight reduction of the vehicle can be attained so that energy efficiency of the vehicle is improved.

The brake apparatus equipped with the engine negative-pressure booster has a favorable pressure-increase responsivity, i.e., has a relatively short time length which is necessary to increase the wheel-cylinder pressure up to a desired hydraulic pressure in response to the brake manipulation of the driver. However, as mentioned above, there is a risk that such a brake apparatus becomes relatively large in size resulting in weight increase. As a brake apparatus equipped with no engine negative-pressure booster, firstly, a brake apparatus equipped with a high-pressure accumulator is conceived. In this brake apparatus, the wheel-cylinder pressure is increased by using (only) a high pressure previously accumulated in the high-pressure accumulator. However, in this brake apparatus, it is difficult to ensure pressure resistance and reliability of the high-pressure accumulator although a certain level of (passable) pressure-increase responsivity can be secured. Also in this case, there is a risk that the size of the brake apparatus becomes large resulting in the weight increase of the brake apparatus. Secondary, a brake apparatus equipped with a large-capacity pump (having a large discharge amount) is conceived as a brake apparatus equipped with no engine negative-pressure booster. In this brake apparatus, the wheel-cylinder pressure is increased by causing a high-power motor to drive the large-capacity pump every brake-pedal manipulation. In this case, the high-power motor and the large-capacity pump may be formed integrally with a master cylinder or may be formed separately from the master cylinder. However, in the case of this brake apparatus, in order to secure a level of the pressure-increase responsivity which is required at the time of sudden braking (for example, in order to increase the wheel-cylinder pressure from 0 Mpa up to 8 Mpa within 250 milliseconds), each of the high-power motor and the large-capacity pump is designed to have an extremely large size to enlarge weight thereof as compared with a normal one. Hence, there is a possibility that specifications of the high-power motor and the large-capacity pump are excessive for regular use. On the other hand, if trying to inhibit the high-power motor and the large-capacity pump from growing in size, there is a risk that a shortage of the pressure-increase responsivity is caused.

Contrary to this, in the apparatus 1 according to the first embodiment, an assist pressure-increasing section which is constituted by the master cylinder 5 and the pump 7 assists increase of the wheel-cylinder pressure. Accordingly, because the master cylinder 5 or the pump 7 assists the rise of the wheel-cylinder pressure, the pressure-increase responsivity of the wheel-cylinder pressure (i.e., responsivity at the time of braking) can be improved even in the case that the apparatus 1 is not equipped with the engine negative-pressure booster. Moreover, because a hydraulic source for the pressure-increase assist does not need to output so high pressure (so large flow amount), it is unnecessary to enlarge sizes of the pump 7 and the motor 60. Of course, it is unnecessary to use the high-pressure accumulator. Therefore, in the first embodiment, the apparatus 1 can be inhibited from growing in size and weight.

When the wheel-cylinder pressure is increased up to the certain level by the brake manipulation of the driver, the servo control section 103 produces the wheel-cylinder pressure by the servo control instead of the depressing-force brake. When the control for wheel-cylinder pressure is switched from the depressing-force brake to the servo control, there is a risk that the wheel-cylinder pressure unnecessarily drops if a drive command for activating (energizing) the motor 60 is outputted at the same timing as output of a drive command for activating (energizing) the pressure-regulating valve 24. This is because the responsivity of the pressure-regulating valve 24 is quicker than the responsivity of the pump 7 or the motor 60. As a countermeasure against this drop of the wheel-cylinder pressure, it is conceivable that the responsivity of the pump 7 and the motor 60 is brought close to the responsivity of the pressure-regulating valve 24. If the ECU which is normally used is unchanged, size and weight of the motor need to be enlarged in order to achieve this countermeasure. On the other hand, if a source voltage for the motor is designed to be higher in order to achieve this countermeasure, a high-voltage battery needs to be mounted on the vehicle, so that a worsening of vehicle mountability and an increase of vehicle weight are incurred. Moreover, if the size and weight of the pump are reduced to equalize each responsivity in order to achieve the countermeasure, the discharge amount of the pump is reduced so that a reduction of the pressure-increase responsivity is incurred.

Contrarily, the apparatus 1 according to the first embodiment includes the switching-drive adjusting section 104 that controls drive timing (activation timing) of the pressure-regulating valve 24. Hence, the unnecessary drop of the wheel-cylinder pressure can be prevented, without the size increase of the motor and the provision of the high-voltage battery.

When the wheel-cylinder pressure is reduced down to the certain level by the brake manipulation of the driver, the servo control section 103 produces the wheel-cylinder pressure by the depressing-force brake instead of the servo control. When the control for wheel-cylinder pressure is switched from the servo control to the depressing-force brake, there is a risk that the wheel-cylinder pressure unnecessarily rises if a drive-OFF command for deactivating the motor 60 is outputted at the same timing as output of a drive-OFF command for deactivating the pressure-regulating valve 24. This is because the responsivity of the pressure-regulating valve 24 is quicker than the responsivity of the pump 7 or the motor 60. Such a rise of the wheel-cylinder pressure incurs an excessive vehicle deceleration. As a countermeasure against this rise of the wheel-cylinder pressure, it is conceivable that the responsivity of the pump 7 and the motor 60 is brought close to the responsivity of the pressure-regulating valve 24. If the size and weight of the pump and the motor are reduced to equalize each responsivity in order to achieve the countermeasure, the discharge amount of the pump is reduced so that a reduction of the pressure-increase responsivity is incurred.

Contrarily, the apparatus 1 according to the first embodiment includes the switching-drive adjusting section 104 that controls drive timing (deactivation timing) of the pressure-regulating valve 24. Hence, the unnecessary rise of the wheel-cylinder pressure can be prevented, without the size reduction of the motor and the pump.

Moreover, even if a trouble that brake fluid leaks out from the connecting pipe 10R connected with the suction oil passage 12 is caused, the servo control (increase/reduction of the wheel-cylinder pressure) can be continued by using the liquid pool 12a as a supply source or discharge port of brake fluid. Hence, a fail-safe performance is improved in the first embodiment. Moreover, because the second simulator oil passage 17 is provided, also the stroke simulator 27 (sub-chamber R2) can function as a supply source or discharge port (i.e., as a liquid pool) of brake fluid even if the above-mentioned trouble is caused. Hence, the fail-safe performance is further improved. The sub-chamber R2 of the stroke simulator 27 does not necessarily need to communicate with the suction oil passage 12, instead may be directly exposed to a low-pressure area (atmospheric pressure). Moreover, because the normally-closed communication valve 23S is provided, the P-line on which the hydraulic sensor 92P is provided for sensing brake-fluid pressure is independent from the S-line on which the hydraulic sensor 92S is provided for sensing brake-fluid pressure. Hence, the wheel-cylinder pressures of the P-line and the wheel-cylinder pressures of the S-line can be increased by the depressing-force brake independently from each other even when the power supply fails. Therefore, the fail-safe performance is improved. Moreover, if the normally-closed pressure-regulating valve 24 fails under the open state, the wheel-cylinder pressure becomes unable to be sufficiently adjusted and drains through the first pressure-reducing oil passage 14, so that a braking performance becomes difficult to maintain. Therefore, the normally-open communication valve 23P is additionally provided as a means for detecting the failure of the pressure-regulating valve 24 in the first embodiment. That is, the failure of the pressure-regulating valve 24 can be detected by properly changing the open/closed states of the communication valve 23P and the communication valve 23S and then checking a detection value of the hydraulic sensor 93 every change. Hence, the fail-safe performance is improved.

In the first embodiment, the normally-closed pressure-regulating valve 24 may be replaced with a normally-open pressure-regulating valve whereas the normally-open communication valve 23P may be replaced with a normally-closed communication valve. Also in this case, the same operations and effects as mentioned above are obtainable by driving (activating) the motor 60 in advance of driving (activating) the communication valve 23 (23P, 23S).

Second Embodiment

Figure 16:
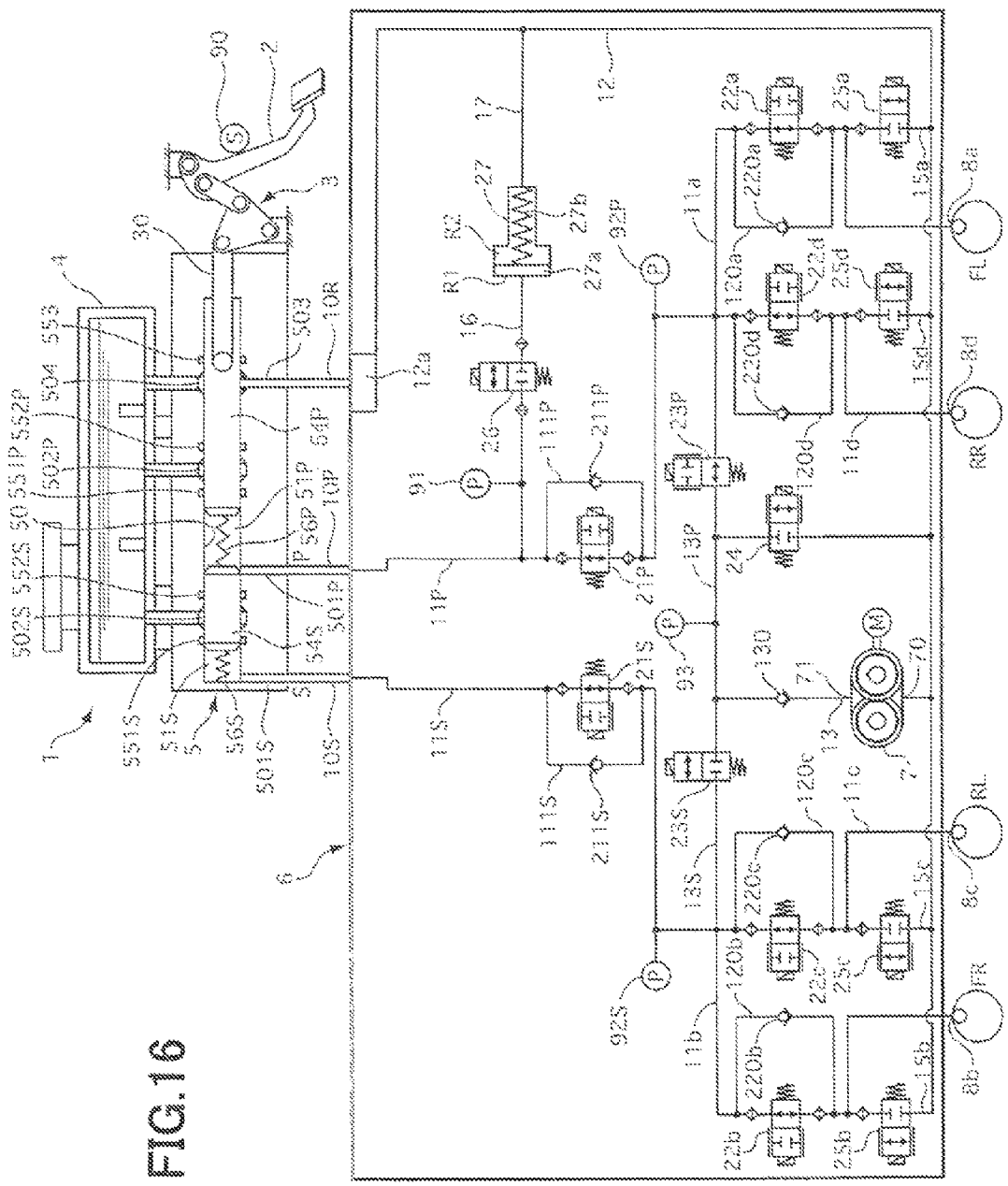
FIG. 16 is a hydraulic circuit diagram of a brake apparatus in a second embodiment according to the present invention.

A second embodiment according to the present invention will now be explained. Because a basic configuration of the second embodiment is the same as that of the first embodiment, structures different from the first embodiment will be explained in the following description. FIG. 16 is a hydraulic circuit diagram of a brake apparatus according to the second embodiment. In the second embodiment, the brake apparatus includes an oil passage 111 (111P, 111S) which bypasses the shutoff valve 21 (21P, 21S). Moreover, a check valve 211 (211P, 211S) is provided on the oil passage 111 (111P, 111S) connected with both ends of the shutoff valve 21 (21P, 21S). In the second embodiment, even if the shutoff valve 21 (21P, 21S) fails under the closed state when the driver has depressed the brake pedal 2 to enlarge the pedal stroke by the depressing-force brake, each wheel-cylinder pressure can be increased through the check valve 211 (211P, 211S).

Also in the second embodiment, if the pump 7 is activated at the same timing as an activation of the pressure-regulating valve 24 when the servo control section 103 switches the control for wheel-cylinder pressure from the depressing-force brake to the servo control, the pressure-regulating valve 24 opens before the pump 7 discharges brake fluid. This is because the responsivity of the pressure-regulating valve 24 is quicker than the responsivity of the pump 7, and incurs an unnecessarily drop of the wheel-cylinder pressure, as mentioned above. Thereby, brake fluid flows from the master cylinder 5 through the check valve 211 (211P, 211S) of the oil passage 111 (111P, 111S) toward the wheel cylinders, so that the master-cylinder pressure is reduced to incur a reduction of the depressing force. Therefore, also in the second embodiment, the switching-drive adjusting section 104 drives (activates) the motor 60 in advance of driving (activating) the pressure-regulating valve 24. Hence, the reduction of wheel-cylinder pressure which is accompanied by the reduction of master-cylinder pressure and the reduction of depressing force can be avoided.

Next, some configurations and advantageous effects obtainable from the above embodiments according to the present invention will now be listed and explained.

[a] A brake control apparatus comprising: a first pressure-applying section (corresponding to the master cylinder 5) connected through a first oil passage (11P, 11S) to a wheel cylinder (8a-8d), and configured to apply hydraulic pressure to the wheel cylinder (8a-8d); a pump (7) provided separately from the first pressure-applying section (5) and configured to apply hydraulic pressure to the wheel cylinder (8a-8d); a communication valve (23P, 23S) provided on a second oil passage (the discharge oil passage 13P, 13S) which connects the first oil passage (11P, 11S) with the pump (7); a backflow passage (corresponding to the second pressure-reducing oil passage 15a-15d) connecting a suction side of the pump (7) with a portion between the pump (7) and the communication valve (23P, 23S) in the second oil passage (13P, 13S), the backflow passage (15a-15d) being connected with a pressure-reducing oil passage; a pressure-regulating valve (24) provided on the backflow passage (15a-15d); and a control unit (corresponding to ECU 100) configured to control the pump (7), the communication valve (23P, 23S) and the pressure-regulating valve (24), wherein the control unit (100) is configured to attain a first state (corresponding to the depressing-force-brake state) that causes the first pressure-applying section (5) to apply hydraulic pressure to the wheel cylinder (8a-8d), and a second state (corresponding to the servo-control state) that causes the pump (7) to apply hydraulic pressure to the wheel cylinder (8a-8d) by driving the pump (7) and at least one of the communication valve (23P, 23S) and the pressure-regulating valve (24) in an opening direction, and configured to actuate the at least one of the communication valve (23P, 23S) and the pressure-regulating valve (24) with a delay relative to an actuation of the pump (7), when switching from the first state to the second state. Accordingly, because the pump 7 is in operation at the time of servo-control state, the energy efficiency can be improved as compared with the case that the servo unit is always in operation. Moreover, because the actuation (activation) of the pressure-regulating valve 24 is delayed relative to the actuation (activation) of the pump 7 when the first state is shifted to the second state, a fluctuation in deceleration which is caused due to responsivity difference between the pump 7 and the pressure-regulating valve 24 can be suppressed.

[b] The brake control apparatus as described in the item [a], wherein the control unit (100) is configured to actuate the pressure-regulating valve (24) after the pump (7) has become in a predetermined rotational state, when switching from the first state to the second state. Accordingly, the fluctuation in deceleration which is caused due to responsivity difference between the pump 7 and the pressure-regulating valve 24 can be reliably suppressed.

[c] The brake control apparatus as described in the item [a], wherein the control unit (100) is configured to actuate the pressure-regulating valve (24) after a rotational speed of the pump (7) has become higher than or equal to a predetermined speed, when switching from the first state to the second state. Accordingly, the fluctuation in deceleration which is caused due to responsivity difference between the pump 7 and the pressure-regulating valve 24 can be reliably suppressed.

[d] The brake control apparatus as described in the item [a], wherein the control unit (100) is configured to actuate the pressure-regulating valve (24) after a discharge pressure of the pump (7) has become higher than or equal to a predetermined pressure, when switching from the first state to the second state. Accordingly, the fluctuation in deceleration which is caused due to responsivity difference between the pump 7 and the pressure-regulating valve 24 can be reliably suppressed.

[e] The brake control apparatus as described in the item [a], wherein the pump (7) and the pressure-regulating valve (24) are configured to be driven by drive signals outputted from the control unit (100), and the control unit (100) is configured to output the drive signal for driving the pressure-regulating valve (24) with a delay relative to an output of the drive signal for driving the pump (7), when switching from the first state to the second state. Accordingly, the fluctuation in deceleration which is caused due to responsivity difference between the pump 7 and the pressure-regulating valve 24 can be reliably suppressed only by deviating respective drive-signal output timings from each other by time shift.

[f] The brake control apparatus as described in the item [a], wherein, when the second state ends, the control unit (100) actuates the pressure-regulating valve (24) in a closing direction after actuating the communication valve (23S) in a closing direction and also after the pump (7) has stopped. Accordingly, the fluctuation in deceleration which is caused due to responsivity difference between the pump 7 and the pressure-regulating valve 24 can be reliably suppressed.

[g] A brake control apparatus comprising: a first pressure-applying section (corresponding to the master cylinder 5) connected through a first oil passage (11P, 11S) to a wheel cylinder (8a-8d), and configured to apply hydraulic pressure to the wheel cylinder (8a-8d); a pump (7) provided separately from the first pressure-applying section (5), and configured to apply hydraulic pressure to the wheel cylinder (8a-8d); a communication valve (23P, 23S) provided on a second oil passage (corresponding to the discharge oil passage 13P, 13S) which connects the first oil passage (11P, 11S) with the pump (7); a backflow passage (corresponding to the second pressure-reducing oil passage 15a-15d) connecting a suction side of the pump (7) with a portion between the pump (7) and the communication valve (23P, 23S) in the second oil passage (13P, 13S), the backflow passage (15a-15d) being connected with a pressure-reducing oil passage; and a pressure-regulating valve (24) provided on the backflow passage (15a-15d), wherein a first state (corresponding to the depressing-force-brake state) in which the first pressure-applying section (5) applies hydraulic pressure to the wheel cylinder (8a-8d) is set against a second state (corresponding to the servo-control state) in which the pump (7) applies hydraulic pressure to the wheel cylinder (8a-8d) by actuations of the pump (7) and at least one of the communication valve (23P, 23S) and the pressure-regulating valve (24), and the first state is shifted into the second state by actuating the pump (7) in advance of actuating the at least one of the communication valve (23P, 23S) and the pressure-regulating valve (24) in an opening direction. Accordingly, the fluctuation in deceleration which is caused due to responsivity difference between the pump 7 and the pressure-regulating valve 24 can be suppressed.

[h] The brake control apparatus as described in the item [g], wherein the pressure-regulating valve (24) is actuated after the pump (7) has become in a predetermined rotational state (step S13→step S14 in FIG. 9), when the first state is shifted into the second state. Accordingly, the fluctuation in deceleration which is caused due to responsivity difference between the pump 7 and the pressure-regulating valve 24 can be reliably suppressed.

[i] The brake control apparatus as described in the item [h], wherein the pressure-regulating valve (24) is actuated after a rotational speed of the pump (7) has become higher than or equal to a predetermined speed (step S13→step S14 in FIG. 9), when the first state is shifted into the second state. Accordingly, the fluctuation in deceleration which is caused due to responsivity difference between the pump 7 and the pressure-regulating valve 24 can be reliably suppressed.

[j] The brake control apparatus as described in the item [g], wherein the pressure-regulating valve (24) is actuated after a discharge pressure of the pump (7) has become higher than or equal to a predetermined pressure, when the first state is shifted into the second state. Accordingly, the fluctuation in deceleration which is caused due to responsivity difference between the pump 7 and the pressure-regulating valve 24 can be reliably suppressed.

[k] The brake control apparatus as described in the item [g], wherein the communication valve (23S) is actuated in advance of the actuation of the pressure-regulating valve (24), when the first state is shifted into the second state. Because the communication valve 23S is opened in advance, the pump 7 can reliably apply hydraulic pressure to the wheel cylinder at the time of activation of the pump 7.

[l] The brake control apparatus as described in the item [g], wherein the brake control apparatus further comprises a control unit (corresponding to the ECU 100) configured to control the pump (7) and the pressure-regulating valve (24), and the control unit (100) outputs a drive signal for driving the pump (7) in advance of outputting a drive signal for driving the pressure-regulating valve (24), when the first state is shifted into the second state. Accordingly, the fluctuation in deceleration which is caused due to responsivity difference between the pump 7 and the pressure-regulating valve 24 is reliably suppressed only by deviating respective drive-signal output timings from each other by time shift.

[m] A brake control apparatus comprising: a primary-line oil passage (corresponding to the first oil passage 11P) including a plurality of wheel cylinders (8a, 8d) to which hydraulic pressure of a first chamber (corresponding to the first fluid chamber 51P) of a master cylinder (5) is able to be applied by a pedal manipulation of a driver; a secondary-line oil passage (corresponding to the first oil passage 11S) including a plurality of wheel cylinders (8b, 8c) to which hydraulic pressure of a second chamber (corresponding to the second fluid chamber 51S) of the master cylinder (5) is able to be applied by the pedal manipulation; a shutoff valve (21P, 21S) provided on each of the primary-line oil passage (11P) and the secondary-line oil passage (11S); a communication passage (corresponding to the discharge oil passage 13P, 13S) connecting the primary-line oil passage (11P) with the secondary-line oil passage (11S); a pump (7) configured to discharge brake fluid into the communication passage (13P, 13S); a first communication valve (corresponding to the communication valve 23P) provided on the communication passage (13P, 13S) and configured to restrict a brake-fluid flow from the communication passage (13P, 13S) toward the primary-line oil passage (11P); a second communication valve (corresponding to the communication valve 23S) provided on the communication passage (13P, 13S) and configured to restrict a brake-fluid flow from the communication passage (13P, 13S) toward the secondary-line oil passage (11S); a backflow passage (corresponding to the second pressure-reducing oil passage 15a-15d) connecting a suction side of the pump (7) with a portion between the pump (7) and one of the first and second communication valves (23P, 23S) in the communication passage (13P, 13S), the backflow passage (15a-15d) being connected with a pressure-reducing oil passage having a low pressure; and a pressure-regulating valve (24) provided on the backflow passage (15a-15d), wherein a first state (corresponding to the depressing-force-brake state) in which the master cylinder (5) applies hydraulic pressure to the wheel cylinders (8a-8d) by actuating the shutoff valve (21P, 21S) in an opening direction is set against a second state (corresponding to the servo-control state) in which the pump (7) applies hydraulic pressure to the wheel cylinders (8a-8d) by selectively driving the shutoff valve (21P, 21S), the first and second communication valves (23P, 23S), the pressure-regulating valve (24) and the pump (7), wherein a way to shift the first state into the second state has a first mode (FIG. 2) and a second mode (FIG. 11), wherein in the first mode, the pressure-regulating valve (24) is opened after actuating the shutoff valve (21P, 21S) in a closing direction and actuating the pump (7), wherein in the second mode, the shutoff valve (21P, 21S) is actuated in the closing direction, after actuating the pressure-regulating valve (24) in the opening direction, actuating at least one of the first and second communication valves (23P, 23S) in the closing direction, and actuating the pump (7). Accordingly, the fluctuation in deceleration which is caused due to responsivity difference between the pump 7 and the pressure-regulating valve 24 can be suppressed.

[n] The brake control apparatus as described in the item [m], wherein in the first mode, the pressure-regulating valve (24) is actuated after the pump (7) has become in a predetermined rotational state. Accordingly, the fluctuation in deceleration which is caused due to responsivity difference between the pump (7) and the pressure-regulating valve 24 can be reliably suppressed.

[o] The brake control apparatus as described in the item [n], wherein in the first mode, the pressure-regulating valve (24) is actuated after a discharge pressure of the pump (7) has become higher than or equal to a predetermined pressure. Accordingly, the fluctuation in deceleration which is caused due to responsivity difference between the pump 7 and the pressure-regulating valve 24 can be reliably suppressed.

[p] The brake control apparatus as described in the item [m], wherein in the first mode, the pressure-regulating valve (24) is actuated after a discharge pressure of the pump (7) has become higher than or equal to a predetermined pressure. Accordingly, the fluctuation in deceleration which is caused due to responsivity difference between the pump 7 and the pressure-regulating valve 24 can be reliably suppressed.

[q] The brake control apparatus as described in the item [m], wherein in the second mode, the shutoff valve (21P, 21S) is actuated in the closing direction after the pump (7) has become in a predetermined rotational state. Accordingly, the fluctuation in deceleration which is caused due to responsivity difference between the pump 7 and the pressure-regulating valve 24 can be reliably suppressed.

[r] The brake control apparatus as described in the item [m], wherein in the second mode, the shutoff valve (21P, 21S) is actuated in the closing direction after a rotational speed of the pump (7) has become higher than or equal to a predetermined speed. Accordingly, the fluctuation in deceleration which is caused due to responsivity difference between the pump 7 and the pressure-regulating valve 24 can be reliably suppressed.

[s] The brake control apparatus as described in the item [m], wherein the brake control apparatus further comprises a control unit (corresponding to the ECU 100) configured to control the pump (7), the first and second communication valves (23P, 23S) and the pressure-regulating valve (24), and wherein in the first mode, the control unit (100) outputs a drive signal for driving the pump (7) in advance of outputting a drive signal for driving the pressure-regulating valve (24). Accordingly, the fluctuation in deceleration which is caused due to responsivity difference between the pump 7 and the pressure-regulating valve 24 is certainly suppressed only by deviating respective drive-signal output timings from each other by time shift.

[t] The brake control apparatus as described in the item [m], wherein the brake control apparatus further comprises a control unit (corresponding to the ECU 100) configured to control the pump (7), the first and second communication valves (23P, 23S), the pressure-regulating valve (24) and the shutoff valve (21P, 21S), and wherein in the second mode, the control unit (100) outputs drive signals for driving the pressure-regulating valve (24), the pump (7) and at least one of the first and second communication valves (23P, 23S) in advance of outputting a drive signal for driving the shutoff valve (21P, 21S). Accordingly, the fluctuation in deceleration which is caused due to responsivity difference between the pump 7 and the pressure-regulating valve 24 is certainly suppressed only by deviating respective drive-signal output timings from each other by time shift.

Although the invention has been described above with reference to certain embodiments of the invention, the invention is not limited to the embodiments described above. Modifications and variations of the embodiments described above will occur to those skilled in the art in light of the above teachings.

This application is based on prior Japanese Patent Application No. 2013-130082 filed on Jun. 21, 2013. The entire contents of this Japanese Patent Application are hereby incorporated by reference.

The scope of the invention is defined with reference to the following claims.

What is claimed is:

1. A brake control apparatus comprising:
a first pressure-applying section connected through a first oil passage to a wheel cylinder, and configured to apply hydraulic pressure to the wheel cylinder;
a pump provided separately from the first pressure-applying section, and configured to apply hydraulic pressure to the wheel cylinder;
a communication valve provided on a second oil passage which connects the first oil passage with the pump;
a backflow passage connecting a suction side of the pump with a portion between the pump and the communication valve in the second oil passage, the backflow passage being connected with a pressure-reducing oil passage;
a pressure-regulating valve provided on the backflow passage; and
a control unit configured to control the pump, the communication valve and the pressure-regulating valve,
wherein the control unit is configured
to attain a first state that causes the first pressure-applying section to apply hydraulic pressure to the wheel cylinder, and a second state that causes the pump to apply hydraulic pressure to the wheel cylinder by driving the pump and at least one of the communication valve and the pressure-regulating valve in an opening direction,
to actuate the at least one of the communication valve and the pressure-regulating valve with a delay relative to an actuation of the pump, when switching from the first state to the second state, and
to actuate the pressure-regulating valve after a discharge pressure of the pump has become higher than or equal to a predetermined pressure, when switching from the first state to the second state.

2. The brake control apparatus as claimed in claim 1, wherein
the control unit is configured to actuate the pressure-regulating valve after the pump has become in a predetermined rotational state, when switching from the first state to the second state.

3. The brake control apparatus as claimed in claim 1, wherein
the control unit is configured to actuate the pressure-regulating valve after a rotational speed of the pump has become higher than or equal to a predetermined speed, when switching from the first state to the second state.

4. A brake control apparatus comprising:
a first pressure-applying section connected through a first oil passage to a wheel cylinder, and configured to apply hydraulic pressure to the wheel cylinder;
a pump provided separately from the first pressure-applying section, and configured to apply hydraulic pressure to the wheel cylinder;
a communication valve provided on a second oil passage which connects the first oil passage with the pump;
a backflow passage connecting a suction side of the pump with a portion between the pump and the communication valve in the second oil passage, the backflow passage being connected with a pressure-reducing oil passage;
a pressure-regulating valve provided on the backflow passage; and
a control unit configured to control the pump, the communication valve and the pressure-regulating valve,
wherein the control unit is configured
to attain a first state that causes the first pressure-applying section to apply hydraulic pressure to the wheel cylinder, and a second state that causes the pump to apply hydraulic pressure to the wheel cylinder by driving the pump and at least one of the communication valve and the pressure-regulating valve in an opening direction,
to actuate the at least one of the communication valve and the pressure-regulating valve with a delay relative to an actuation of the pump, when switching from the first state to the second state, and
wherein the pump and the pressure-regulating valve are configured to be driven by drive signals outputted from the control unit, and the control unit is configured to output the drive signal for driving the pressure-regulating valve with a delay relative to an output of the drive signal for driving the pump, when switching from the first state to the second state.

5. A brake control apparatus comprising:
a first pressure-applying section connected through a first oil passage to a wheel cylinder, and configured to apply hydraulic pressure to the wheel cylinder;

a pump provided separately from the first pressure-applying section, and configured to apply hydraulic pressure to the wheel cylinder;

a communication valve provided on a second oil passage which connects the first oil passage with the pump;

a backflow passage connecting a suction side of the pump with a portion between the pump and the communication valve in the second oil passage, the backflow passage being connected with a pressure-reducing oil passage;

a pressure-regulating valve provided on the backflow passage; and a control unit configured to control the pump, the communication valve and the pressure-regulating valve, wherein the control unit is configured to attain a first state that causes the first pressure-applying section to apply hydraulic pressure to the wheel cylinder, and a second state that causes the pump to apply hydraulic pressure to the wheel cylinder by driving the pump and at least one of the communication valve and the pressure-regulating valve in an opening direction, to actuate the at least one of the communication valve and the pressure-regulating valve with a delay relative to an actuation of the pump, when switching from the first state to the second state, and wherein, when the second state ends, the control unit actuates the pressure-regulating valve in a closing direction after actuating the communication valve in a closing direction and also after the pump has stopped.

6. A brake control apparatus comprising:

a first pressure-applying section connected through a first oil passage to a wheel cylinder, and configured to apply hydraulic pressure to the wheel cylinder;

a pump provided separately from the first pressure-applying section, and configured to apply hydraulic pressure to the wheel cylinder;

a communication valve provided on a second oil passage which connects the first oil passage with the pump;

a backflow passage connecting a suction side of the pump with a portion between the pump and the communication valve in the second oil passage, the backflow passage being connected with a pressure-reducing oil passage; and a pressure-regulating valve provided on the backflow passage, wherein a first state in which the first pressure-applying section applies hydraulic pressure to the wheel cylinder is set against a second state in which the pump applies hydraulic pressure to the wheel cylinder by actuations of the pump and at least one of the communication valve and the pressure-regulating valve, the first state is shifted into the second state by actuating the pump in advance of actuating the at least one of the communication valve and the pressure-regulating valve in an opening direction, and wherein the pressure-regulating valve is actuated after the pump has become in a predetermined rotational state, when the first state is shifted into the second state.

7. The brake control apparatus as claimed in claim 6, wherein the pressure-regulating valve is actuated after a rotational speed of the pump has become higher than or equal to a predetermined speed, when the first state is shifted into the second state.

8. The brake control apparatus as claimed in claim 6, wherein the pressure-regulating valve is actuated after a discharge pressure of the pump has become higher than or equal to a predetermined pressure, when the first state is shifted into the second state.

9. The brake control apparatus as claimed in claim 6, wherein the brake control apparatus further comprises a control unit configured to control the pump and the pressure-regulating valve, and the control unit outputs a drive signal for driving the pump in advance of outputting a drive signal for driving the pressure-regulating valve, when the first state is shifted into the second state.

10. A brake control apparatus comprising:

a first pressure-applying section connected through a first oil passage to a wheel cylinder, and configured to apply hydraulic pressure to the wheel cylinder;

a pump provided separately from the first pressure-applying section, and configured to apply hydraulic pressure to the wheel cylinder;

a communication valve provided on a second oil passage which connects the first oil passage with the pump;

a backflow passage connecting a suction side of the pump with a portion between the pump and the communication valve in the second oil passage, the backflow passage being connected with a pressure-reducing oil passage; and a pressure-regulating valve provided on the backflow passage, wherein a first state in which the first pressure-applying section applies hydraulic pressure to the wheel cylinder is set against a second state in which the pump applies hydraulic pressure to the wheel cylinder by actuations of the pump and at least one of the communication valve and the pressure-regulating valve, the first state is shifted into the second state by actuating the pump in advance of actuating the at least one of the communication valve and the pressure-regulating valve in an opening direction, and the communication valve is actuated in advance of the actuation of the pressure-regulating valve, when the first state is shifted into the second state.

11. A brake control apparatus comprising:

a primary-line oil passage including a plurality of wheel cylinders to which hydraulic pressure of a first chamber of a master cylinder is able to be applied by a pedal manipulation of a driver;

a secondary-line oil passage including a plurality of wheel cylinders to which hydraulic pressure of a second chamber of the master cylinder is able to be applied by the pedal manipulation;

a shutoff valve provided on each of the primary-line oil passage and the secondary-line oil passage;

a communication passage connecting the primary-line oil passage with the secondary-line oil passage;

a pump configured to discharge brake fluid into the communication passage;

a first communication valve provided on the communication passage and configured to restrict a brake-fluid flow from the communication passage toward the primary-line oil passage;

a second communication valve provided on the communication passage and configured to restrict a brake-fluid flow from the communication passage toward the secondary-line oil passage;

a backflow passage connecting a suction side of the pump with a portion between the pump and one of the first and second communication valves in the communication passage, the backflow passage being connected with a pressure-reducing oil passage having a low pressure; and a pressure-regulating valve provided on the backflow passage, wherein a first state in which the master cylinder applies hydraulic pressure to the wheel cylinders by actuating the shutoff valve in an opening direction is set against a second state in which the pump applies hydraulic pressure to the wheel cylinders by selectively driving the shutoff valve, the first and second communication valves, the pressure-regulating valve and the pump, wherein a way to shift the first state into the second state has a first mode and a second mode, in the first mode, the pressure-regulating valve is opened after actuating the shutoff valve in a closing direction and actuating the pump, and in the second mode, the shutoff valve is actuated in the closing direction, after actuating the pressure-regulating valve in the opening direction, actuating at least one of the first and second communication valves in the closing direction, and actuating the pump.

12. The brake control apparatus as claimed in claim 11, wherein
in the first mode, the pressure-regulating valve is actuated after the pump has become in a predetermined rotational state.

13. The brake control apparatus as claimed in claim 12, wherein
in the first mode, the pressure-regulating valve is actuated after a discharge pressure of the pump has become higher than or equal to a predetermined pressure.

14. The brake control apparatus as claimed in claim 11, wherein in the first mode, the pressure-regulating valve is actuated after a discharge pressure of the pump has become higher than or equal to a predetermined pressure.

15. The brake control apparatus as claimed in claim 11, wherein in the second mode, the shutoff valve is actuated in the closing direction after the pump has become in a predetermined rotational state.

16. The brake control apparatus as claimed in claim 11, wherein in the second mode, the shutoff valve is actuated in the closing direction after a rotational speed of the pump has become higher than or equal to a predetermined speed.

17. The brake control apparatus as claimed in claim 11, wherein the brake control apparatus further comprises a control unit configured to control the pump, the first and second communication valves and the pressure-regulating valve, and in the first mode, the control unit outputs a drive signal for driving the pump in advance of outputting a drive signal for driving the pressure-regulating valve.

18. The brake control apparatus as claimed in claim 11, wherein the brake control apparatus further comprises a control unit configured to control the pump, the first and second communication valves, the pressure-regulating valve and the shutoff valve, and in the second mode, the control unit outputs drive signals for driving the pressure-regulating valve, the pump and at least one of the first and second communication valves in advance of outputting a drive signal for driving the shutoff valve.

* * * * *